US010666540B2

(12) United States Patent
Alves et al.

(10) Patent No.: US 10,666,540 B2
(45) Date of Patent: May 26, 2020

(54) DYNAMIC TIME-DOMAIN REFLECTOMETRY ANALYSIS FOR FIELD REPLACEABLE UNIT ISOLATION IN A RUNNING SYSTEM

(71) Applicant: INTERNATIONAL BUSINESS MACHINES CORPORATION, Armonk, NY (US)

(72) Inventors: Luiz C. Alves, Hopewell Junction, NY (US); Patrick J. Meaney, Poughkeepsie, NY (US); Christopher N. Oelsner, Boeblingen (DE); Gary A. Peterson, Rochester, MN (US); Christopher Steffen, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/651,346

(22) Filed: Jul. 17, 2017

(65) Prior Publication Data
US 2019/0020565 A1    Jan. 17, 2019

(51) Int. Cl.
*H04L 1/00* (2006.01)
*H04L 12/26* (2006.01)
(Continued)

(52) U.S. Cl.
CPC .......... *H04L 43/50* (2013.01); *G06F 13/4022* (2013.01); *G06F 13/4282* (2013.01);
(Continued)

(58) Field of Classification Search
CPC ............ H04L 41/0645; H04L 41/0677; H04L 41/069; H04L 41/147; H04L 43/08;
(Continued)

(56) References Cited

U.S. PATENT DOCUMENTS 4,890,224 A * 12/1989 Fremont ............. G06F 11/2007
    710/11
5,450,416 A *  9/1995 Bowcutt ............. G06F 11/2294
    370/242
(Continued)

FOREIGN PATENT DOCUMENTS

CN    104253644 A    12/2014
CN    105933055 A     9/2016
(Continued)

OTHER PUBLICATIONS

Authors et. al.: Disclosed Anonymously, "Embedded Digital Sampling Oscilloscope in Serial Link Transmitter," IPCOM000231875D, Oct. 10, 2013, pp. 1-8.
(Continued)

*Primary Examiner* — Raj Jain
(74) *Attorney, Agent, or Firm* — Cantor Colburn LLP; William Kinnaman

(57) ABSTRACT

A technique relates to dynamic time-domain reflectometry (TDR). A machine spares a bad lane in a bus. The bad lane is taken offline. TDR is dynamically executed on the bad lane while the bus is still in operation. A defect is isolated using results of the TDR.

8 Claims, 18 Drawing Sheets

(51) Int. Cl.
*H04L 12/24* (2006.01)
*G06F 13/40* (2006.01)
*G06F 13/42* (2006.01)

(52) U.S. Cl.
CPC ...... *H04L 41/0645* (2013.01); *H04L 41/0659* (2013.01); *H04L 43/0823* (2013.01)

(58) Field of Classification Search
CPC .. H04L 1/24; H04L 2001/0094; G06F 11/079; G06F 11/0709; G06F 11/0769; G06F 13/4282
See application file for complete search history.

(56) References Cited

U.S. PATENT DOCUMENTS

| | | | | |
|---|---|---|---|---|
| 5,502,392 | A * | 3/1996 | Arjavalingam | G01R 27/06 324/625 |
| 5,574,250 | A * | 11/1996 | Hardie | H01B 11/005 174/102 R |
| 5,664,105 | A * | 9/1997 | Keisling | H04L 12/40032 709/224 |
| 5,675,723 | A * | 10/1997 | Ekrot | G06F 11/2033 714/17 |
| 5,704,048 | A * | 12/1997 | Fleck | G06F 13/4022 710/306 |
| 5,717,337 | A * | 2/1998 | Kelly | G01F 23/26 324/533 |
| 6,614,968 | B1 * | 9/2003 | Eslambolchi | G02B 6/4469 385/100 |
| 7,133,403 | B1 * | 11/2006 | Mo | H04L 41/12 370/390 |
| 7,165,120 | B1 * | 1/2007 | Giles | G06F 13/4022 361/724 |
| 7,171,586 | B1 * | 1/2007 | Gross | G06F 11/3414 702/183 |
| 7,210,081 | B1 * | 4/2007 | Euzent | G01R 31/2803 714/725 |
| 7,292,952 | B1 * | 11/2007 | Gross | G06F 11/3058 702/104 |
| 7,478,010 | B2 * | 1/2009 | Hashennian | G05B 23/0283 700/9 |
| 7,640,468 | B2 | 12/2009 | Linam et al. | |
| 8,446,165 | B2 * | 5/2013 | McCoy | G01R 31/2801 324/763.01 |
| 9,916,217 | B2 * | 3/2018 | Kangas | G06F 11/273 |
| 2005/0170691 | A1 * | 8/2005 | Mobley | H05K 1/0242 439/540.1 |
| 2007/0143050 | A1 * | 6/2007 | Booth, Jr. | G01R 35/00 702/104 |
| 2009/0072845 | A1 * | 3/2009 | McCoy | G01R 31/2801 324/757.02 |
| 2009/0072846 | A1 * | 3/2009 | Fjerstad | G01R 1/06772 324/757.02 |
| 2009/0161741 | A1 * | 6/2009 | Ginis | H04M 3/304 375/224 |
| 2010/0005345 | A1 * | 1/2010 | Ferraiolo | G06F 11/073 714/49 |
| 2010/0005349 | A1 * | 1/2010 | Ferraiolo | G06F 11/0724 714/704 |
| 2010/0180154 | A1 * | 7/2010 | Bellows | G11C 29/20 714/30 |
| 2010/0229048 | A1 * | 9/2010 | Karam | H04L 12/10 714/48 |
| 2010/0277197 | A1 * | 11/2010 | Deutsch | G01R 31/2818 324/750.16 |
| 2010/0283437 | A1 * | 11/2010 | Chung | H02M 1/44 323/212 |
| 2011/0080237 | A1 * | 4/2011 | Fratti | H04L 25/0288 333/28 R |
| 2011/0246093 | A1 * | 10/2011 | Wood | G06F 11/008 702/34 |
| 2011/0320921 | A1 * | 12/2011 | Gower | H04L 1/24 714/799 |
| 2013/0051247 | A1 * | 2/2013 | Reese | H04L 43/08 370/242 |
| 2013/0154677 | A1 * | 6/2013 | Sun | G01R 31/2884 324/750.3 |
| 2013/0215899 | A1 * | 8/2013 | Stark | H04L 47/39 370/394 |
| 2013/0262735 | A1 * | 10/2013 | Ikeda | G06F 13/4022 710/317 |
| 2013/0265079 | A1 * | 10/2013 | Pupalaikis | G01R 31/2818 324/763.01 |
| 2014/0016505 | A1 * | 1/2014 | Smith | H04L 41/022 370/254 |
| 2014/0195712 | A1 * | 7/2014 | Ryu | G06F 13/4022 710/313 |
| 2015/0058518 | A1 * | 2/2015 | Kleineberg | G06F 13/4022 710/316 |
| 2015/0160283 | A1 | 6/2015 | Hall et al. | |
| 2016/0097901 | A1 | 4/2016 | Lu et al. | |
| 2016/0103944 | A1 | 4/2016 | Allred | |
| 2019/0020565 | A1 * | 1/2019 | Alves | H04L 41/0645 |
| 2019/0020566 | A1 * | 1/2019 | Alves | H04L 41/0645 |

FOREIGN PATENT DOCUMENTS

| | | |
|---|---|---|
| GB | 2481135 A | 12/2011 |
| WO | 2006083855 A2 | 8/2006 |

OTHER PUBLICATIONS

Authors et. al.: Disclosed Anonymously, "Method to isolate interconnect faults using low resolution TDR hardware," IPCOM000240251D, Jan. 15, 2015, pp. 1-7.
Luiz C. Alves et al., "Dynamic Time-Domain Reflectometry Analysis for Field Replaceable Unit Isolation in a Running System", Related Application, U.S. Appl. No. 15/808,319, filed Nov. 9, 2017.
List of IBM Patents or Patent Applications Treated as Related; (Appendix P), Filed Nov. 10, 2017.

\* cited by examiner

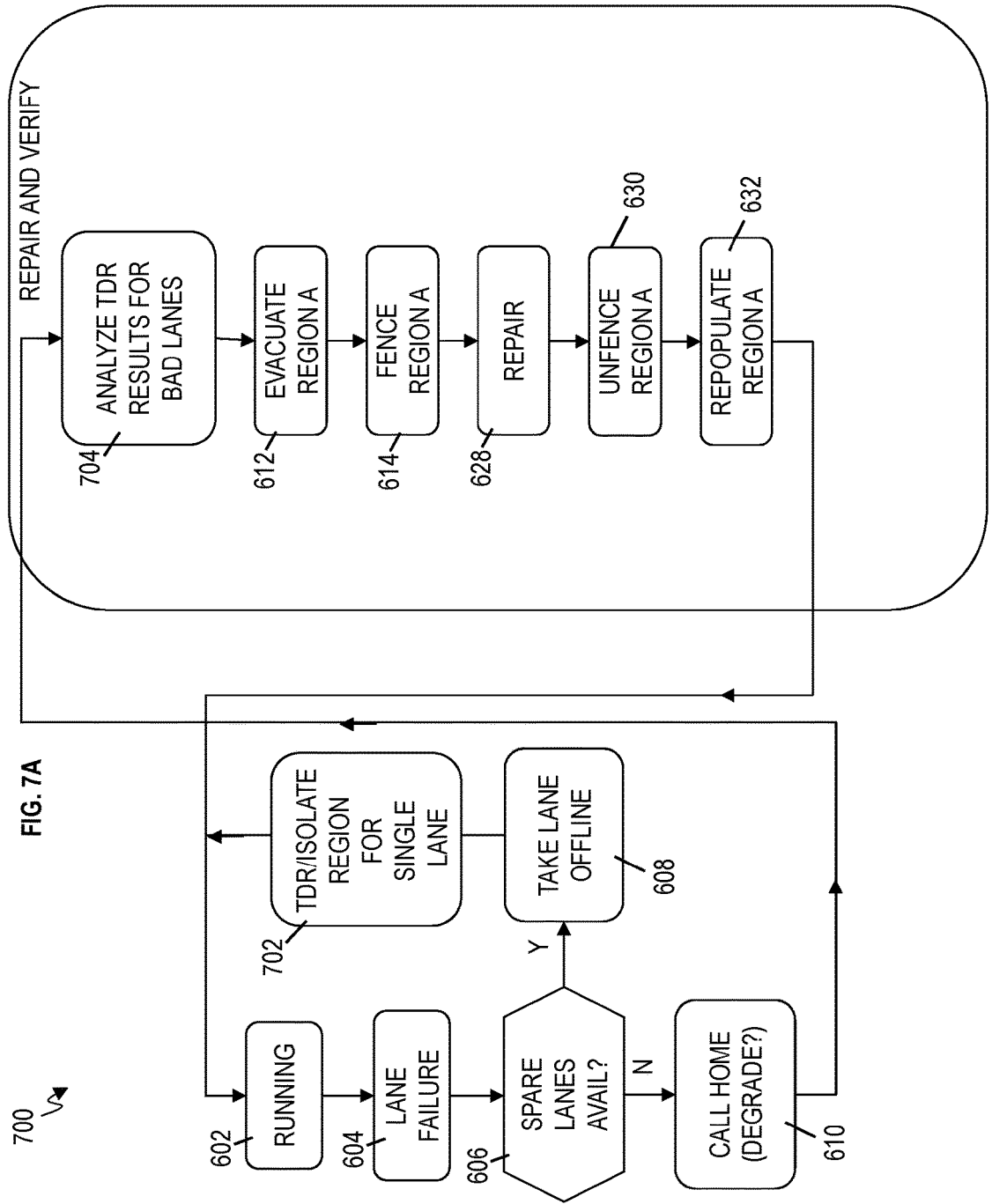

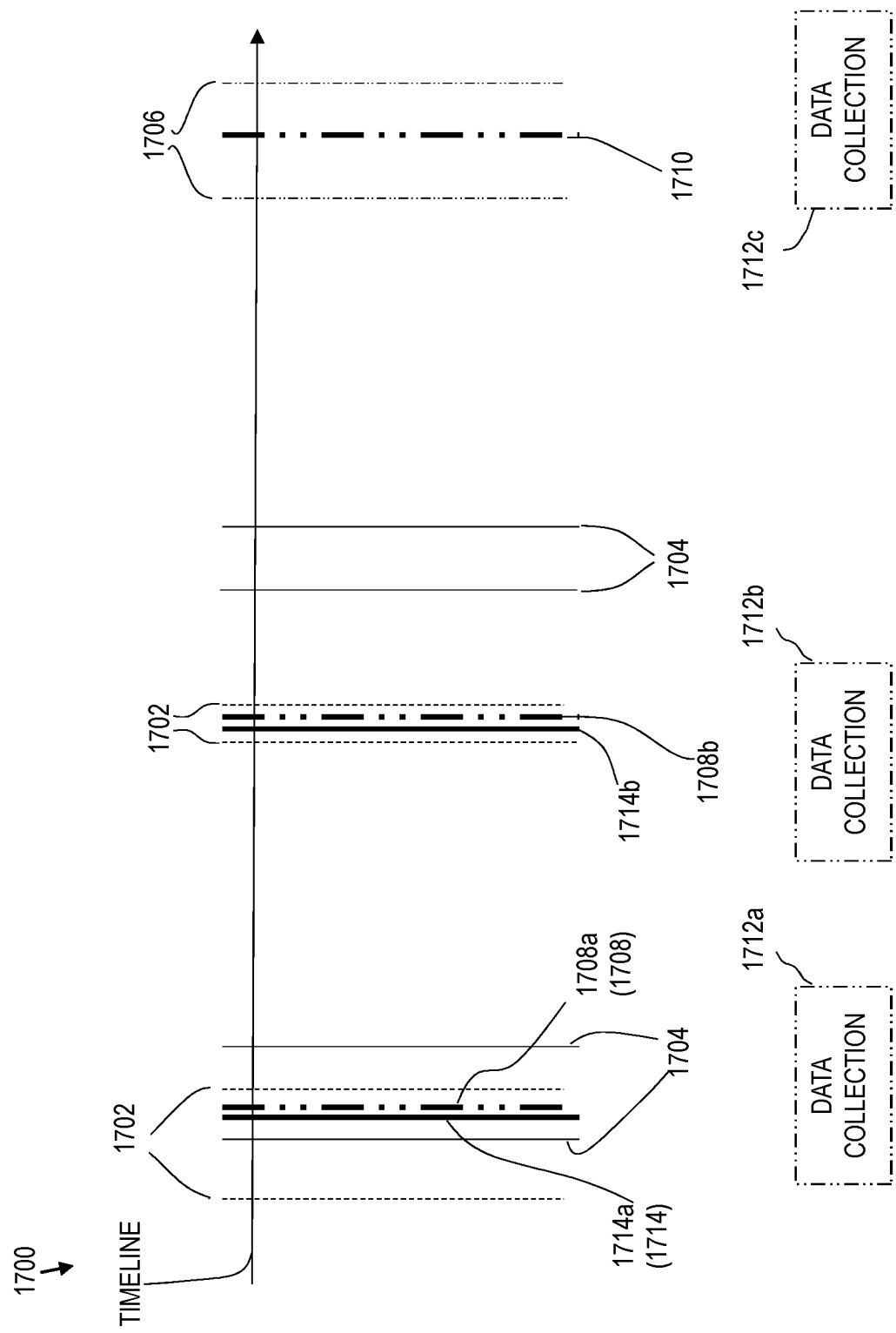

DYNAMIC TIME-DOMAIN REFLECTOMETRY ANALYSIS FOR FIELD REPLACEABLE UNIT ISOLATION IN A RUNNING SYSTEM

BACKGROUND

The present invention generally relates to computer systems, and more specifically, to dynamic time-domain reflectometry (TDR) analysis for field replaceable unit (FRU) isolation in a running system.

Time-domain reflectometry is a measurement technique used to determine the characteristics of electrical lines and/or circuits connected to the electrical line by observing reflected waveforms. Time-domain transmissometry (TDT) is an analogous technique that measures the transmitted (rather than reflected) impulse. Together, they provide a powerful means of analyzing electrical or optical transmission media such as coaxial cable and optical fiber. Variations of TDR exist. For example, spread-spectrum time-domain reflectometry (SSTDR) is used to detect intermittent faults in complex and high-noise systems such as aircraft wiring. Coherent optical time domain reflectometry (COTDR) is another variant, used in optical systems, in which the returned signal is mixed with a local oscillator and then filtered to reduce noise. The impedance of the discontinuity can be determined from the amplitude of the reflected signal. The distance to the reflecting impedance can also be determined from the time that a pulse takes to return.

SUMMARY

Embodiments of the present invention are directed to a computer-implemented method for dynamic time-domain reflectometry (TDR). A non-limiting example of the computer-implemented method includes sparing, by a machine, a bad lane in a bus, taking the bad lane offline, dynamically executing TDR on the bad lane while the bus is still in operation, and isolating a defect using results of the TDR.

Embodiments of the invention are directed to a computer program product for dynamic time-domain reflectometry (TDR), the computer program product comprising a computer readable storage medium having program instructions embodied therewith. The computer readable storage medium is not a transitory signal per se, and the program instructions are readable by a machine to cause the machine to perform a method. A non-limiting example of the method includes sparing, by the machine, a bad lane in a bus, taking the bad lane offline, dynamically executing TDR on the bad lane while the bus is still in operation, and isolating a defect using results of the TDR.

Embodiments of the present invention are directed to a computer-implemented method for dynamically isolating a defect. A non-limiting example of the computer-implemented method includes sparing, by a machine, a bad lane in a bus, taking the bad lane offline, quiescing the bus, executing time-domain reflectometry (TDR) on the bad lane of the bus having been quiesced, unquiescing the bus, and isolating the defect using results of the TDR.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 7A depicts a flow chart of performing dynamic TDR analysis according to embodiments;

FIG. 17 depicts a timeline including failure events, static TDR, and dynamic TDR according to embodiments of the invention.

Figure 1:
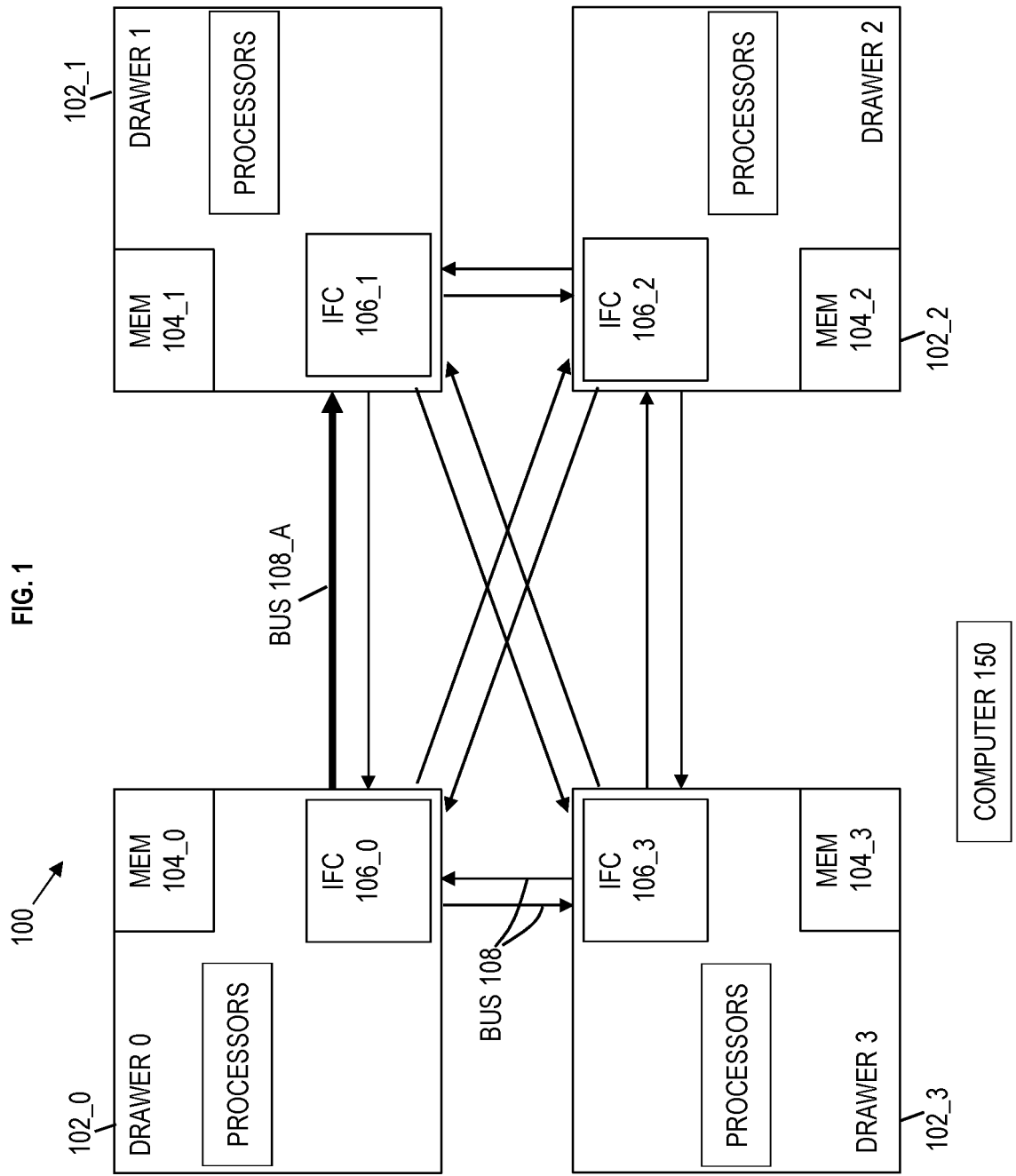
FIG. 1 depicts a system according to embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, a field-replaceable unit (FRU) is a circuit board, part, or assembly that can be quickly and easily removed from a computer or other piece of electronic equipment (such as equipment removed from a rack in a server farm). The FRU can be replaced by the user or a technician without having to send the entire product or system to a repair facility. FRU represents many different types of equipment which can be connected to other equipment, and so forth. A technical problem can arise, and FRU isolation is needed to determine which FRU needs to be removed and replaced. To help isolate technical problems associated with FRU, a time-domain reflectometer is an electronic instrument that uses time-domain reflectometry (TDR) to characterize and locate faults in metallic cables (for example, twisted pair wire or coaxial cable). Additionally, the time-domain reflectometer can also be used to locate discontinuities in a connector, printed circuit board, and/or any other electrical path. It is noted that the equivalent device for optical fiber is an optical time-domain reflectometer.

A time-domain reflectometer measures reflections along a conductor. In order to measure those reflections, the time-domain reflectometer will transmit an incident signal onto the conductor and listen for its reflections. If the conductor is of a uniform impedance and is properly terminated, then there will be no reflections and the remaining incident signal will be absorbed at the far-end by the termination. Instead, if there are impedance variations, then some of the incident signal will be reflected back to the source. A time-domain reflectometer is similar in principle to radar. Generally, the reflections will have the same shape as the incident signal, but their sign and magnitude depend on the change in impedance level. If there is a step increase in the impedance, then the reflection will have the same sign as the incident signal; if there is a step decrease in impedance, the reflection will have the opposite sign. The magnitude of the reflection depends not only on the amount of the impedance change, but also upon the loss in the conductor.

The reflections are measured at the output/input to the time-domain reflectometer and displayed or plotted as a function of time. Additionally, the display can be read as a function of cable length because the speed of signal propagation is almost constant for a given transmission medium. Because of its sensitivity to impedance variations, a time-domain reflectometer can be used to verify cable impedance characteristics, splice and connector locations and associated losses, and estimate cable lengths. Time-domain reflectometers are commonly used for in-place testing of very long cable runs, where it is impractical to dig up or remove what may be a kilometers-long cable. They are indispensable for preventive maintenance of telecommunication lines, as time-domain reflectometers can detect resistance on joints and connectors as they corrode, and increasing insulation leakage as it degrades and absorbs moisture, long before either leads to catastrophic failures. Using a time-domain reflectometer, it is possible to pinpoint a fault to within centimeters.

Time-domain reflectometer equipment is also a useful tool in the failure analysis of modern high-frequency printed circuit boards with signal traces crafted to emulate transmission lines. By observing reflections, any unsoldered pins of a ball grid array device can be detected. Short circuited pins can also be detected in a similar fashion.

Currently, TDR is run in an initial microprogram load (IML or boot) (which is a type of microcode) and/or in a repair and verify window. The TDR environment (IML/boot) is often different than the failing environment which has an active workload running with power and noise present. Due to this, TDR isolation may not correlate to actual system failure and could result in repair of an incorrect field replacement unit, thereby leading to an unsuccessful repair. Further, isolation of defective parts is not known at call home time, resulting in a lack of preparedness of the support team for a successful repair window. Another disadvantage is a longer potential repair window due to an incorrect drawer/node evacuation, because the incorrect drawer/node was evacuated after running TDR and the same has to be repopulated and another drawer/node evacuated.

Turning now to an overview of the aspects of the invention, one or more embodiments of the invention address the above-described shortcomings of the prior art by providing dynamic time-domain reflectometry (TDR) analysis for field replaceable unit (FRU) isolation in a running system of, for example, numerous FRUs connected to one another in a systems. Embodiments of the present invention provide techniques for isolating interface errors to the driving side (e.g., drawer transmitting signals), the receiving side (the drawer receiving signals), and/or the board/cables, in field replaceable units in a running system. The techniques include dynamically running time-domain reflectometry on any bad/spared lanes while the system is up (and running/operating), and then determining the drawer/device to be replaced based on the TDR results.

The above-described aspects of the invention address the shortcomings of the prior art by providing the ability to isolate hardware defects before call home. By isolating the hardware defect of the FRU more accurate information at call-home time is provided, as such that the technician does not need to wait until a repair window to get information. Technical effects and benefits include the ability to monitor field bus anomalies prior to calling home which allows for proactive analysis/improvements. Additional technical effects and benefits include more accurate analysis such as: performing TDR analysis during similar run-time environment (in contrast to performing TDR during a quiet boot window), utilizing procurement time rather than using the critical repair window for the TDR analysis, and utilizing statistical samples to improve analysis accuracy (thereby allows for many samples to eliminate ambiguous results). Further, technical effects and benefits include a reduction in technical repair time by reducing an unnecessary evacuation step and repopulation step for 'incorrect guesses' that occur in state-of-the-art drawer-to-drawer failures.

Turning now to a more detailed description of aspects of the present invention, FIG. 1 depicts a system 100 according to embodiments of the invention. The computer system 100 includes computer equipment which is a collection of drawers 102 that are interconnected. Each individual drawer 102 is designated as drawer 102_0 (drawer 0), drawer 102_1 (drawer 1), drawer 102_2 (drawer 2), and drawer 102_3 (drawer 3). The drawers 102 are each bi-directionally connected to one another by buses 108. In an embodiment, the buses 108 are implemented as independent, unidirectional buses.

Each of the drawers 102_0 through 102_3 and the individual buses 108 are FRUs and can be individually replaced upon a failure. As noted above, the drawers 102 are computer equipment. The drawers 102 can each be a server such as a blade server, a rack mount server, etc. Each drawer 102 can include memory, processors, communication boards (i.e., intefaces), etc. For example, the drawers 102_0 through 102_3 respectively include memory 104_0 through 104_3 (generally referred to as memory 104) and interface (IFC) circuit 106_0 through 106_3 (generally referred to as interface 106). The processor is a computing device for executing hardware instructions or software, particularly stored in memory 104. The processor can be any custom made or commercially available processor, a central processing unit (CPU), an auxiliary processor among several processors associated with the drawer 102, a semiconductor based microprocessor (in the form of a microchip or chip set), a macroprocessor, or generally any device for executing instructions. The processor may include a cache, which may be organized as a hierarchy of more cache levels (L1, L2, etc.).

The interface 106 is hardware that allows one drawer 102 to communicate with another drawer 102 via buses 108. The memory 104 is hardware for data storage. The memory 104 may include one or more Dynamic RAMs (DRAMS), (Dual in-line memory modules) DIMMs, hard disk drives (HDD), solid state drives (SSD), or any other suitable form of storage. The memory 104 includes and/or is coupled to a memory controller. The memory 104 (and/or memory controller) is coupled to the interface 106. The memory controller (for example in memory 104 or attached to memory 104) controls access for appropriate communications (reading and writing) to the memory 104 among the processors and interface 106. The interface 106 can include a circuit board and has one or more input and/or output (I/O) devices (or peripherals) that are communicatively coupled via a local input/output controller. The interface 106 is coupled to buses 108, as understood by one skilled in the art. The interface may have additional elements, which are omitted for simplicity, such as controllers, buffers (caches), drivers, repeaters, and receivers, to enable communications.

The memory 104 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 104 may incorporate electronic, magnetic, optical, and/or other types of storage media. Note that the memory 104 can have a distributed architecture, where various components are situated remote from one another, but can be accessed by the processor.

Figure 13:
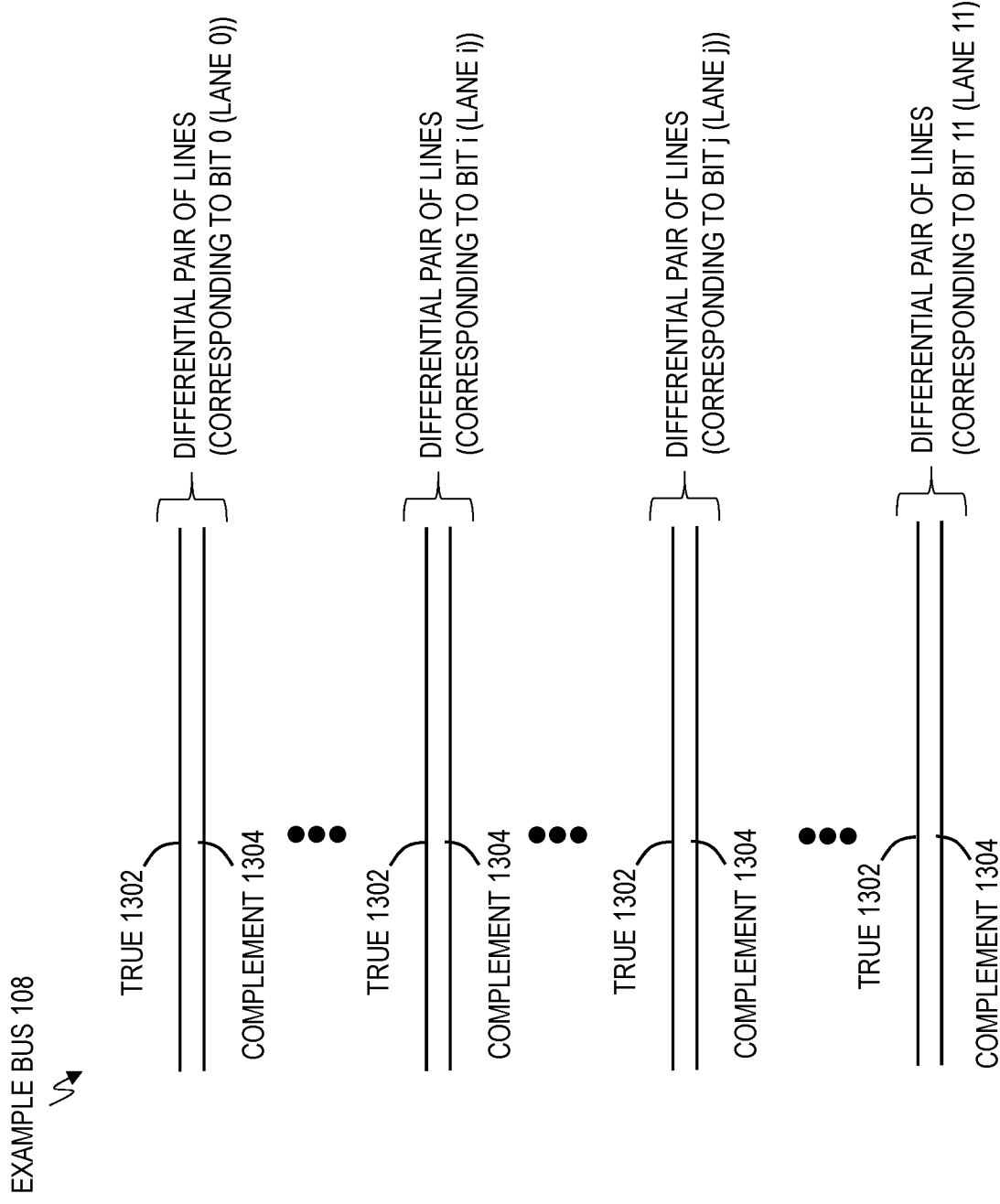
FIG. 13 depicts an example bus having differential wire pairs according to embodiments of the invention.

As noted above, embodiments of the present invention are able to isolate interface errors to the driving side (one drawer 102), the receiving side (another drawer 102), and/or the board/cables (e.g., interface 106/bus 108) connecting the driving and receiving side while in a running system. For explanation purposes, a scenario is depicted in which there is a technical problem between drawer 102_0 and drawer 102_1 but the exact location of the failing/failed equipment (FRU) is unknown at this time. In this scenario, it is assumed that communication from drawer 102_0 to drawer_102_1 is having a problem, and bus 108_A (out of busses 108) is highlighted to illustrate this technical problem. Each bus 108 may have 12 bits such as bits 0-11, as an example. Accordingly, the bus 108 has 12 lanes that connect one drawer 102 to another drawer 102, and each bus 108 can have one or more additional lanes which are spare lanes. A spare lane is unused and is available as a replacement in case one of the main 12 lanes is bad. A lane is a physical connection, such as cables/wires, which connects one drawer 102 to another drawer 102 such that data and commands can be communicated as desired. A lane represents and/or is connected to a bit. In some embodiments of the present invention, each lane can be a differential pair of lines/wires (or differential wires), such that each lane has a true wire 1302 and a complement wire 1304 as depicted in FIG. 13. The driving side applies a different voltage level on both the true wire 1302 and complement wire 1304 such that the receiving side can determine a differential of the two voltage levels, thus determining the desired signal. FIG. 13 depicts that each bus 108 includes 12 lanes, shown as lanes 0-11. Each lane represents a bit, such that lanes 0-11 are for bits 0-11 respectively. Also, an exemplary lane i (which could be any of lanes 0-11) in FIG. 13 may represent a bad lane that was spared (i.e., replaced). An exemplary lane j (which could be any of lanes 0-11, other than lane i) in FIG. 13 may represent a spare lane that is used to spare (i.e., to replace) bad lane i.

Referring back to FIG. 1, it is assumed that there are no more spare lanes in bus 108_A and now lane 7 (bit 7) is failing (as noted above lane 7 is a differential pair of lines). It is not known if the driving side (drawer 102_0), the receiving side (drawer 102_1), or the bus 108_A is bad (or going bad). The drawers 102 have error correcting code (ECC) to correct a bit error. At this point, errors on bit 7 can be corrected by drawer 102_1 on the receiving side but there are no more spare lanes on bus 108_A (if the bus 108_A happens to be the problem and another lane goes bad). For example, hardware, firmware, or software executing on the drawer 102_1 will repair bit 7 by using ECC.

Figure 2:
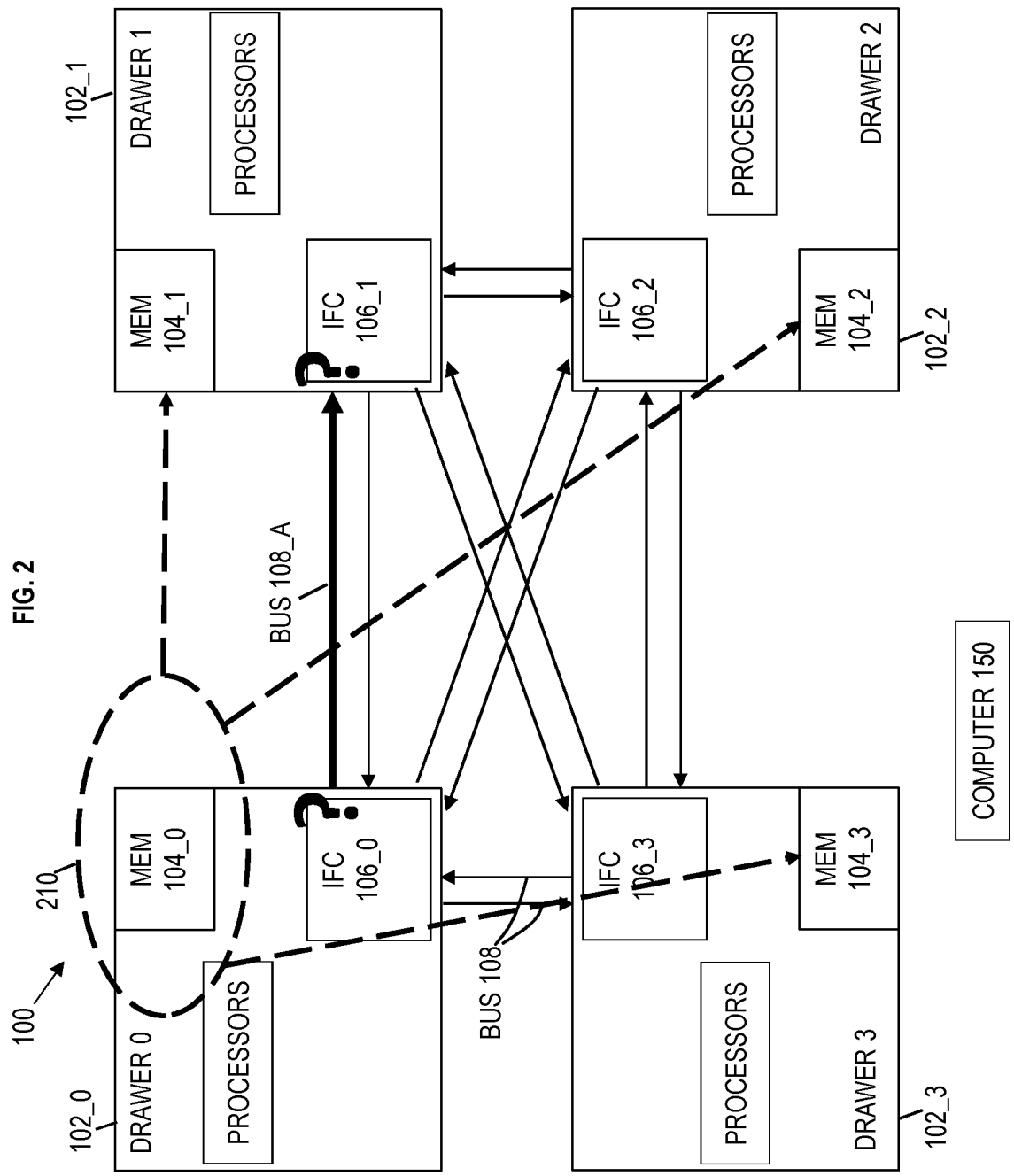
FIG. 2 depicts evacuating the memory of memory according to embodiments of the invention.

Since there is a technical problem communicating from drawer 102_0 to drawer 102_1, it is initially assumed that drawer 102_0 has failed. However, at this point, it is unknown whether the interface 106_0, interface 106_1, and/or bus 108_A (e.g., cable) has failed. Since it is unknown which FRU has failed, the memory 104_0 is evacuated under the assumption that drawer 102_0 has failed, and this evacuation of drawer 102_0 is in order to run time-domain reflectometry analysis. FIG. 2 depicts evacuating the memory of memory 104_0 which is a process to move data from memory 104_0 to the memory 104_1 through 104_3 in respectively connected drawers 102_1 through 102_3. A portion of memory 104_0 can be moved to each of the memory 104_1 through 104_3 according to available space. Some drawers 102_1 through 102_3 can receive less (or even none) or more of the transferred memory from drawer 102_0 than others. Memory evacuation can include migration of data (including live migration) as understood by one skilled in the art. Evacuation of drawer 102_0 also includes moving the processes/tasks assigned to the processors in drawer 102_0 to the processors in drawers 102_1 through 102_3.

Figure 3:
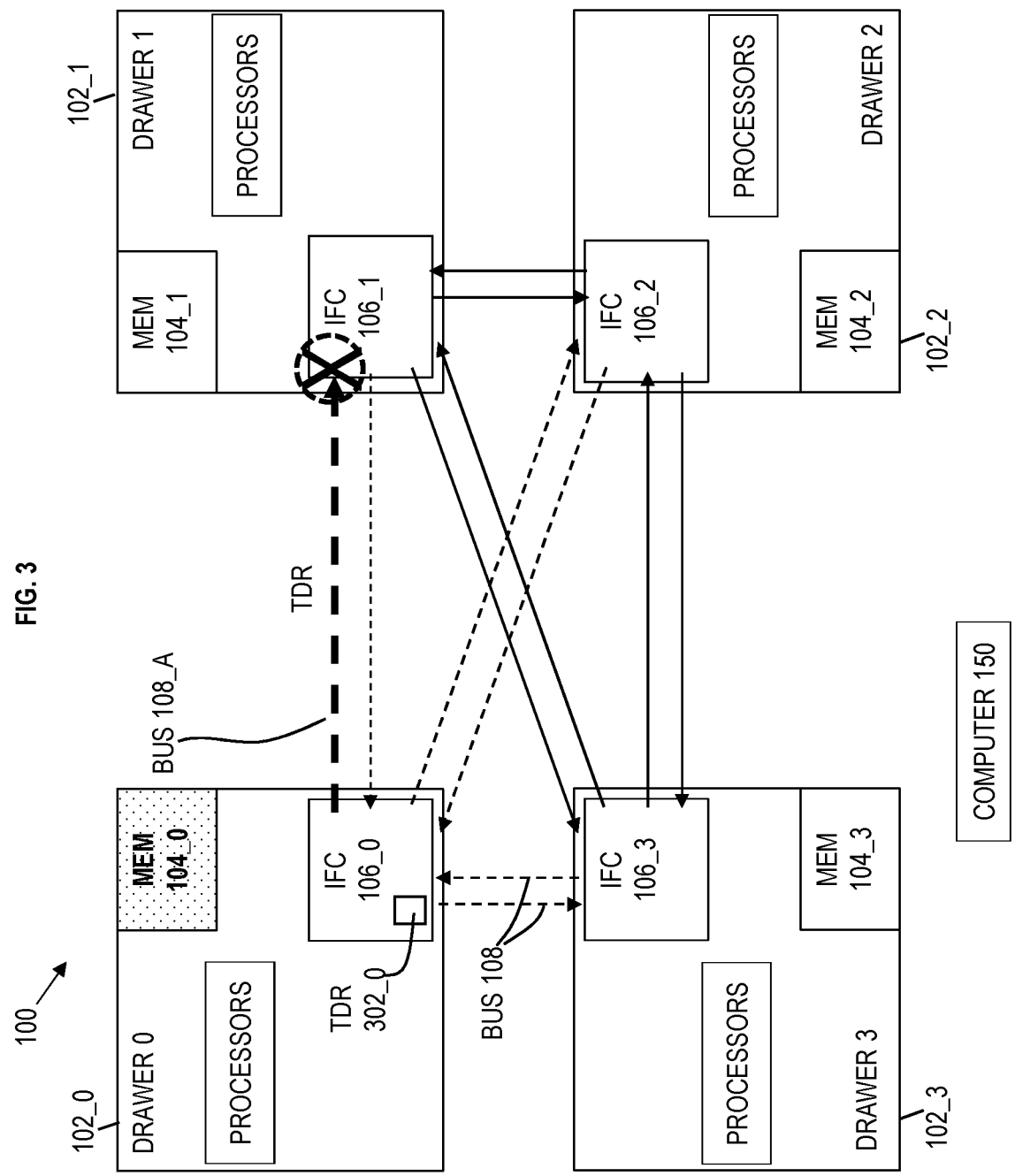
FIG. 3 depicts that a drawer has been fenced off according to embodiments.

FIG. 3 depicts that drawer 102_0 has been fenced off such that time-domain reflectometry analysis can be performed. Being fenced off means that the drawer 102_0 is no longer available to run processes/tasks and no longer available for storage. Each interface circuit 106 can include time-domain reflectometer equipment. The time-domain reflectometer equipment is configured to perform time-domain reflectometry analysis. In this scenario, the TDR equipment 302_0 is highlighted in interface 106_0 of drawer 102_0 (although the other drawers 102 each include TDR equipment (not shown)). At this point, the memory 104_0 has been evacuated (i.e., is empty), and the evacuated memory 104_0 is represented by a dotted patterned. Also, the drawer 102_0 is not being used for computer services, which means that the drawer 102_0 is taken offline (i.e., fenced off) and is therefore inoperable for operating as a server. Additionally, the drawer 102_0 has been fenced off and the buses 108 connecting the drawer 102_0 to other drawers 102_1 through 102_3 are shown with dashed lines to represent that these buses 108 are not being utilized.

The TDR equipment 302_0 in interface 106_0 performs time-domain reflectometry for drawers 102_0, 102_1 and bus 108A, which can include driving signals from the TDR equipment 302_0 to the drawer 102_1 and receiving reflected signals back at the TDR equipment 302_0. Based on receiving the reflected signals, the characteristics of the received reflected signals, the delay in receiving the reflected signals, and/or not receiving some reflected signals, the TDR equipment 302_0 is configured to determine the location of failed FRU.

In this example scenario, the TDR equipment 302_0 determines that the location of the failure is at the interface 106_1 of drawer 102_1. The "X" illustrates that the location of the failed FRU is the interface 106_1. In this case, the drawer 102_0 was unnecessarily evacuated which utilized time and hardware along with bandwidth resources to accomplish, and the memory evacuation caused an interruption in services on drawer 102_0. In the state-of-the-art, the memory evacuation was needed in order to perform TDR analysis by the TDR equipment 302_0 in drawer 102_0 (but memory evacuation is not required before performing dynamic TDR according to embodiments as discussed herein).

Figure 4:
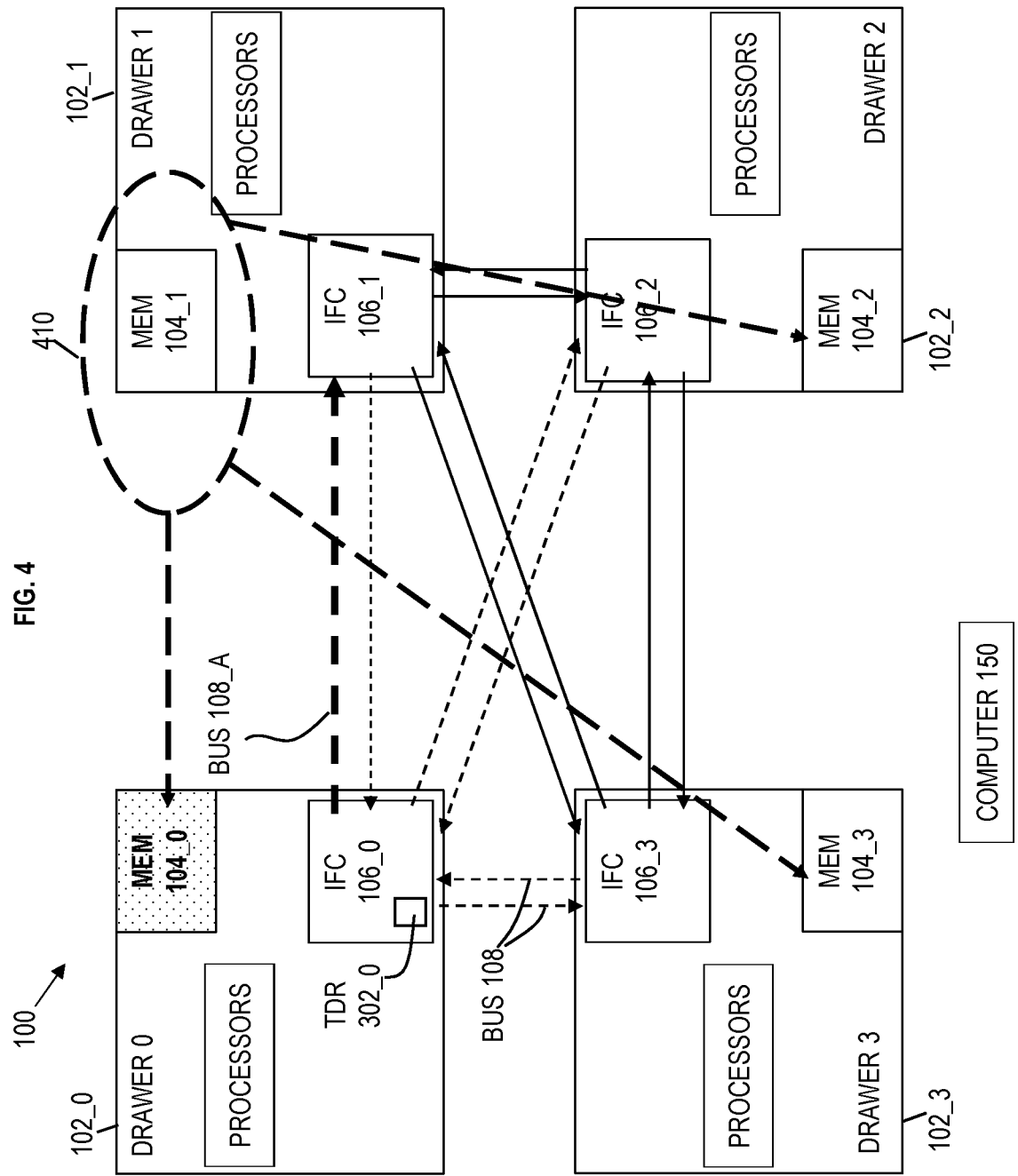
FIG. 4 depicts evacuating memory according to embodiments of the invention.

FIG. 4 depicts evacuating memory 104_1 of the drawer 102_1 because the TDR analysis by the TDR equipment 302_0 determined that the technical problem is the interface 106_1 of drawer 102_1. Memory evacuation in FIG. 4 is analogous to the memory evacuation discussed above in FIG. 2. However, in FIG. 4, the memory 104_1 is being evacuated (transferred) to drawers 102_0, 102_2, and 102_3.

Figure 5:
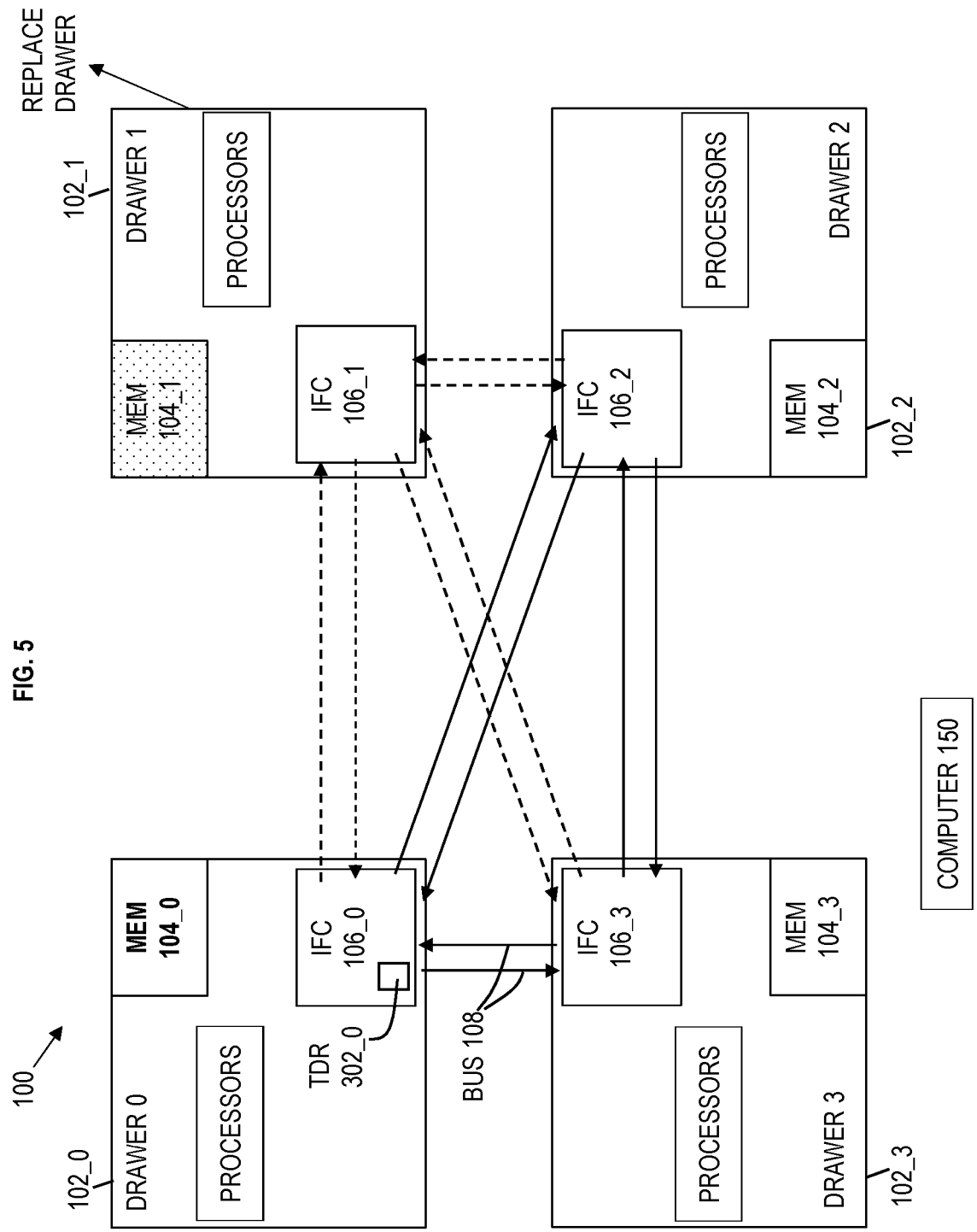
FIG. 5 depicts a drawer after its data has been evacuated to other drawers according to embodiments of the invention.

FIG. 5 depicts the drawer 102_1 after its data has been evacuated to the other drawers 102. Also, the buses 108 connecting the drawer 102_1 to other drawers 102_0, 102_2, and 102_3 have been deactivated. The drawer 102_1 has now been fenced off, and the drawer 102_1 (FRU) is being replaced.

Figure 6:
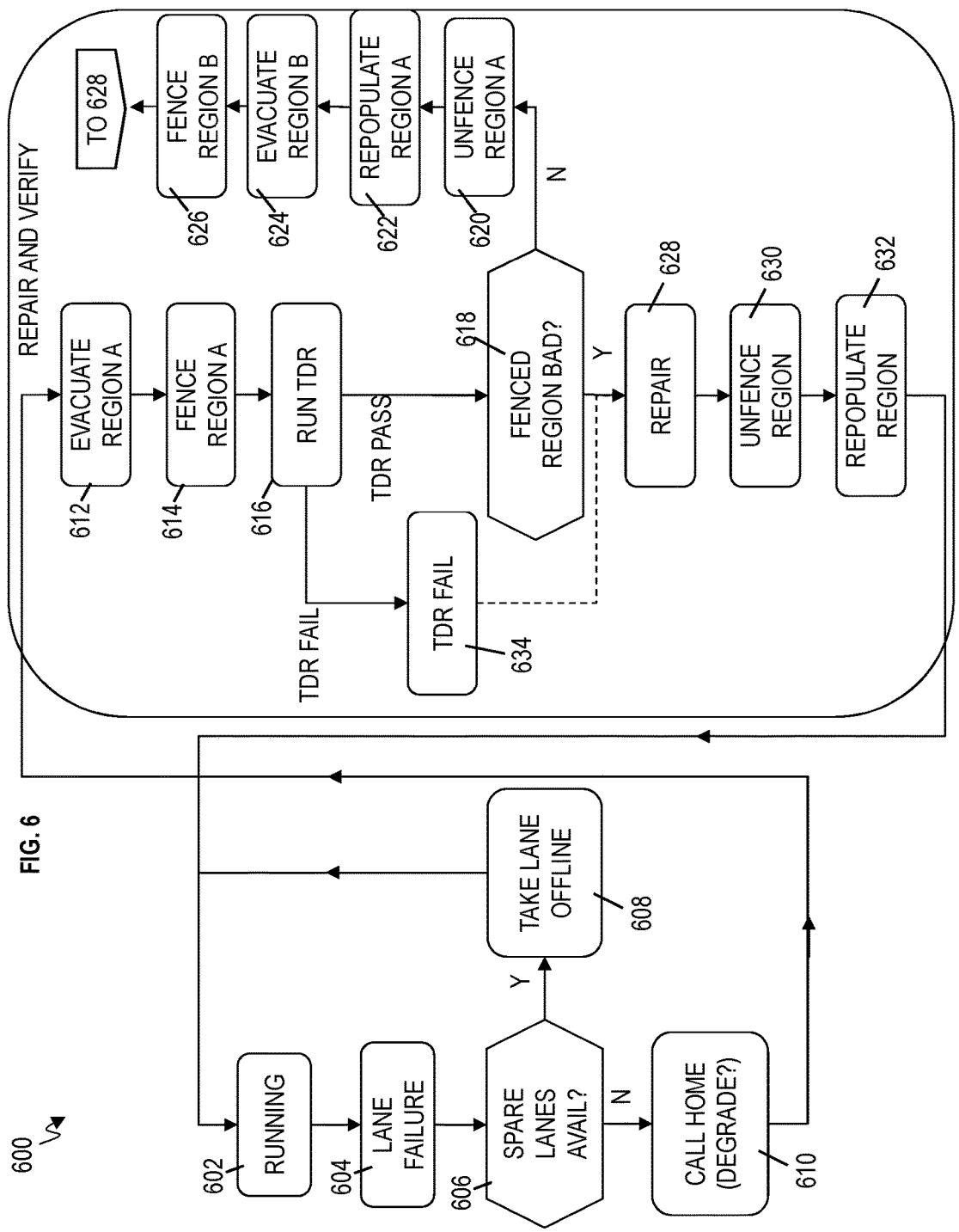
FIG. 6 depicts a flow chart of a process of addressing a problem in the system according to embodiments of the invention.

FIG. 6 is a flow chart 600 of a process of addressing a technical problem in the system 100. Reference can be made to FIGS. 1-5.

At block 602, the system 100 includes drawers 102 that are running which means that the drawers 102 are operating to perform computing services, such as processing, reading and writing to memory, communicating with other drawers 102, etc. A computer 150 can be operatively connected to each of the drawers 102_0 through 102_3, and the computer 150 can be individually connected to any of the drawers 102 as needed. The computer 150 can be a monitoring computer system that monitors the diagnostics of the drawers 102. The connections (e.g., cables) connecting the computer 150 to one or more of the respective drawers 102_0 through 102_3 are not shown so as not to obscure the figures. The following processes can be performed and/or initiated by the computer 150, any one of the drawers 102, and/or a combination of any one of the drawers 102 and the computer 150.

At block 604, a lane failure is detected by a given drawer 102 (or computer 150). A lane failure can mean that there is some problem communicating between one drawer 102 and another drawer 102. Continuing the scenario discussed above, it is assumed that the lane failure is on bus 108_A that connects drawers 102_0 and 102_1. At block 606, the drawer 102_0 (drawer 102_1 and/or computer 150) checks if any spare lanes are available on the bus, for example, bus 108A. If (yes) there are more spare lanes (i.e., unused lanes) available, the drawer 102_0 (drawer 102_1 and/or computer 150) is configured to take the bad lane offline and replace the bad lane with the spare lane, for example, on bus 108_A at block 608. If (no) there are no more spare lanes, the drawer 102_0 (drawer 102_1 and/or computer 150) is configured to "call home" at block 610. Also, the drawer 102_0 (drawer 102_1 and/or computer 150) determines what to degrade/evacuate. Because there is a problem communicating on bus 108_A in the direction from drawer 102_0 to drawer 102_1, the drawer 102_0 (drawer 102_1 and/or computer 150) is configured to degrade/evacuate the drawer 102_0 as discussed above. Also, call home enables the drawer 102 (and/or computer 150) to be monitored 24 hours a day by a technician or technical entity that services computer systems. The call home function provides a service alert when a serious error occurs on the drawers 102 automatically sending details of the error and contact information to the service technician or technical entity.

The flow moves into repair and verify. At block 612, region A is evacuated. In this scenario, region A is represented by the drawer 102_0 but region A can represent any FRU. Continuing the scenario, the drawer 102_0 is configured to evacuate (and/or computer 150 causes the drawer 102_0 to evacuate). During evacuation of the drawer 102_0, the drawer 102_0 is configured to transfer its memory 104_0, reassign its processes (previously running on processors of drawer 102_0), and/or reassign its input/output (I/O) (previously transmitted back and forth to interface circuit 106_0) to the other drawers 102_1, 102_2, 102_3. At block 614, region A is fenced off. In this scenario, the drawer 102_0 (and/or computer 150 causes the drawer 102_0) is fenced off such that the drawer 102_0 is offline and does not perform computer services; the connections via buses 108 are no longer valid to the drawer 102_0.

At block 616, the drawer 102_0 runs TDR, for example, by using the TDR equipment 302_0. In a scenario, the TDR analysis fails to determine the location of the technical problem at block 634 and the flow proceeds to block 628 to repair region A. In an embodiment for TDR analysis failures, repair history is maintained (e.g., in table 750 and/or in computer 150) for a replaced FRU. If an interface error is rediscovered later on the same bus lane, an alternate FRU is selected (e.g. region B rather than region A). In a scenario when TDR equipment 302_0 runs and determines the location of the technical problem, the drawer 102_0 (and/or computer 150) is configured to check if the (previously) fenced off region (e.g., region A) is actually the bad region at block 618. When the initially fenced off region (e.g., region A) was determined to in fact be the bad region by the TDR analysis, the fenced off region is repaired (i.e., replaced) at block 628. In the case when the fenced off region (e.g., drawer 102_0) is the bad region, the drawer 102_0 (and/or computer 150) can confirm (e.g., with a message) to the technician that the drawer 102_0 is bad. At block 630, the region is now unfenced by making the buses 108 connected to the region operable for normal transmissions. For example, after the repair by the technician (e.g., a diagnostic message may indicate to the drawer 102_0 (and/or computer 150) that the drawer 102_0 is working properly (i.e., repaired), and the drawer 102_0 (and/or computer 150) is configured to unfence drawer 102_0.

At block 632, the unfenced region is repopulated. For example, the data that was transferred out of memory 104_0 is now repopulated back to memory 104_0 from memory 104_1, 104_2, 104_3. Also, processes are assigned back to the processors of drawer 102_0, and the input/output (I/O) is assigned back to interface circuit 106_0 of the drawer 102_0.

Taking the other branch of block 618, the region A is unfenced because the TDR analysis determined that region A is not the technical problem at block 620. For example, when the TDR equipment 302_0 runs and determines the (previously) fenced off region (e.g., drawer 102_0) is not actually the bad region as depicted in FIG. 3, the drawer 102_0 (and/or computer 150) is configured to unfence drawer 102_0. As noted above, unfencing drawer 102_0 can include making the buses 108 connected to the drawer 102_0 operable again for normal transmissions to and from the other drawers 102 and region A is repopulated (and available for processes) at block 622.

Because the TDR analysis by the TDR equipment 302_0 determines (at block 616) that region B is bad, region B is evacuated at block 624. For example, region B can represent drawer 102_1. Returning to the example scenario and during evacuation of the drawer 102_1 (e.g., depicted in FIG. 4), the drawer 102_1 (and/or under instruction from computer 150) is configured to transfer its memory 104_1, reassign its processes (previously running on processors of drawer 102_1), and/or reassign its input/output (I/O) (previously transmitted back and forth to interface circuit 106_1) to the other drawers 102_0, 102_2, 102_3.

At block 626, region B is fenced off instead of region A. In this scenario, the drawer 102_1 (and/or computer 150 causes the drawer 102_1) is fenced off such that the drawer 102_1 is offline and does not perform computer services; the connections via buses 108 are no longer valid to the drawer 102_1 as depicted in FIG. 5. Now the flow proceeds to blocks 628, 630, and 632, and the flow applies to region B, such that, for example, drawer 102_1 is analogously repaired, unfenced, and repopulated as discussed herein.

Drawer evacuation is a process that takes a long time, for example, 1-2 hours. If one waits until a drawer is evacuated to run TDR, one misses the opportunity to isolate which side of an interface is at fault (e.g., determine if the fault at drawer 102_0, drawer 102_1, or bus 108_A). Customers (user of the system 100) are negatively impacted because the technician needs a longer repair window, especially when, for example, drawer 102_0 is evacuated incorrectly first (before TDR analysis) and then drawer 102_1 has to be subsequently evacuated after TDR analysis determines the location of the fault. Embodiments of the invention configured for dynamically running TDR on any bad/spared lanes while the machine (e.g., drawer 102_0) is running normally (i.e., prior to any evacuation, while other lanes in a bus are being used for computer operations) and for determining the drawer/device to replace based on the TDR results.

Figure 7B:
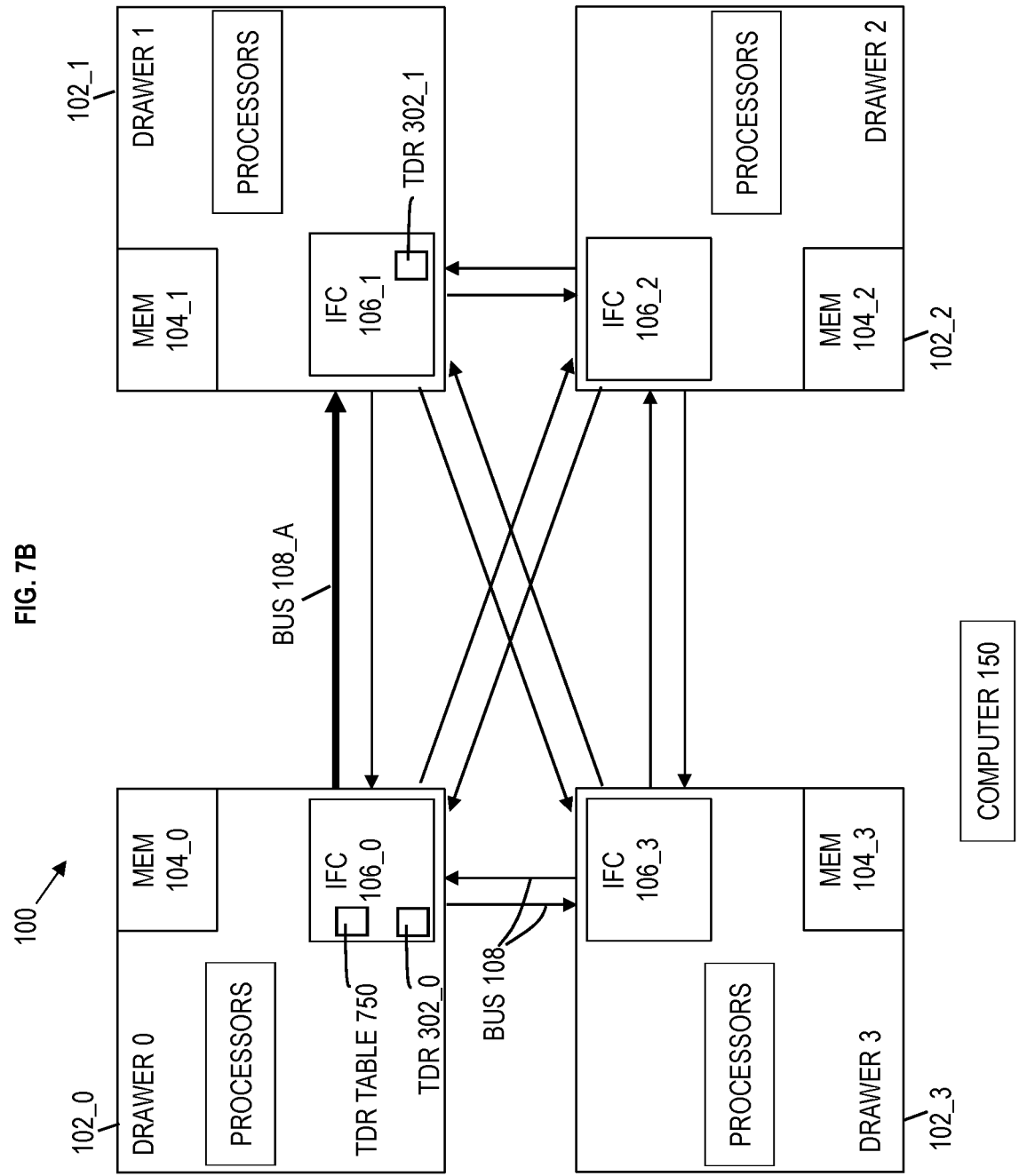
FIG. 7B depicts the system according to embodiments of the invention.

FIG. 7A depicts a flow chart 700 of performing dynamic time-domain reflectometry (TDR) analysis according to embodiments. FIG. 7A includes blocks from FIG. 6 and detailed discussion of those blocks may not be repeated in FIG. 7A. Reference can be made to figures.

At block 602, the system 100 includes drawers 102 that are running which means that the drawers 102 are operating to perform computing services, such as processing, reading and writing to memory, communicating with other drawers 102, etc. As noted herein, the following processes can be performed and/or initiated by the computer 150, any one of the drawers 102, and/or a combination of any one of the drawers 102 and the computer 150.

At block 604, a lane failure is detected by a given drawer 102 (or computer 150). The scenario using drawer 102_0 is continued for explanation purposes and not limitation. At block 606, the drawer 102_0 (drawer 102_1 and/or computer 150) checks if any spare lanes are available on the bus, for example, bus 108A. If (yes) there are more spare lanes (i.e., unused lanes) available, the drawer 102_0 (drawer 102_1 and/or computer 150) is configured to take the bad lane offline and replace the bad lane with the spare lane, for example, on bus 108_A at block 608. The bad lane (e.g., lane 7 corresponding to bit 7) is no longer being used. In addition, the drawer 102_0 (drawer 102_1 and/or computer 150) is configured to run TDR analysis on the bad lane (bad lane 7) of bus 108_A and store the results of the TDR analysis in a TDR analysis table 750 (shown in FIG. 7B) at block 702. In this example scenario, it is assumed that the TDR equipment 302_0 in drawer 102_1 performed the TDR analysis and stored the results in table 750. It is appreciated that TDR equipment in drawer 102_1 could have performed the TDR analysis. The TDR analysis table 750 contains the location of the FRU that is the fault (i.e., needs to be replaced). In this scenario, the table 750 contains the information of whether the drawer 102_0, drawer 102_1, or bus 108_A is bad.

If (no) there are no more spare lanes available following the failure of another bad lane, the drawer 102_0 (drawer 102_1 and/or computer 150) is configured to "call home" at block 610 but does not need to degrade/evacuate any drawer 102 yet. The flow moves into repair and verify. At block 704, the drawer 102_0 (and/or computer 150) is configured to parse and analyze the TDR results in the TDR table 750 in order to find the location of the fault which is at region A. In this scenario, the drawer 102_0 (and/or computer 150) determines that the location of the fault is at the drawer 102_1 (as depicted in FIG. 3) which now represents region A. In accordance with embodiments of the invention, region A has been determined as the fault without first having to evacuate drawer 102_0 (incorrectly) and/or without having to evacuate drawer 102_1. Now that drawer 102_1 is determined to be the fault, the flow continues in an analogous manner as discussed herein. For example, at block 612, region A is evacuated, which means that the FRU drawer 102_1 is evacuated (as depicted in FIG. 4) because TDR analysis determined that drawer 102_1 is bad (not drawer 102_0). The drawer 102_1 is configured to evacuate (and/or computer 150 causes the drawer 102_1 to evacuate). During evacuation of the drawer 102_1, the drawer 102_1 is configured to transfer its memory contents from memory 104_1 to memory on other drawers (namely, to memory 104_0, 104_2, and/or 104_3). During evacuation, the drawer 102_1 also reassigns its processes (previously running on processors of drawer 102_1), and/or reassigns its input/output (I/O) (previously transmitted back and forth to interface circuit 106_1) to the other drawers 102_0, 102_2, 102_3. At block 614, region A is fenced off. In this scenario, the drawer 102_1 is fenced off (and/or computer 150 causes the drawer 102_1 to be fenced off) such that the drawer 102_1 is offline and does not perform computer services; the connections via buses 108 are no longer valid to the drawer 102_1. At this point, TDR equipment 302_0 has already been run to determine the location of the problem, which is the drawer 102_1 and TDR analysis is not required to be run after drawer 102_1 has been evacuated. This results in a shorter repair window (time). The fenced off region A is repaired (i.e., replaced) at block 628. For example, the drawer 102_1 is replaced. At block 630, the region A is now unfenced by making the buses 108 connected to the (previously fenced off) region A operable for normal transmissions. For example, after the repair by the technician (e.g., a diagnostic message may indicate to the drawer 102_1 (and/or computer 150) that the drawer 102_1 is working properly (i.e., repaired)), the drawer 102_1 (and/or computer 150) is configured to unfence drawer 102_1.

At block 632, the unfenced region A is repopulated. For example, the data that was transferred out of memory 104_1 is repopulated back to memory 104_1 of the replaced drawer 102_1 from memory 104_0, 104_2, 104_3 and the processes (assigned tasks) are restored back on the processors and input/output of the drawer 102_1.

Figure 8:
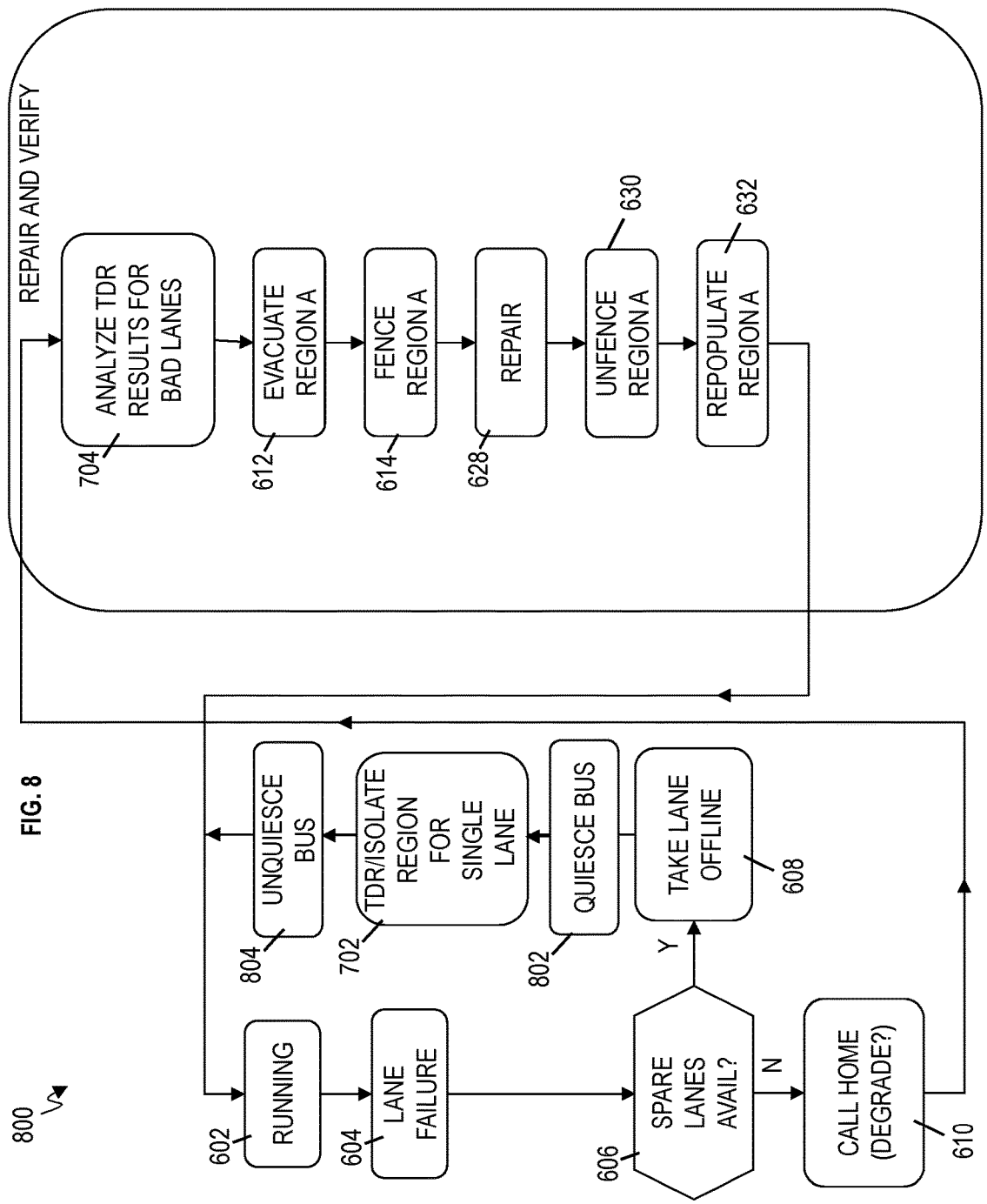
FIG. 8 depicts a flow chart of performing dynamic TDR analysis according to embodiments.

FIG. 8 depicts a flow chart 800 of performing dynamic time-domain reflectometry (TDR) analysis according to embodiments. FIG. 8 includes blocks from FIGS. 6 and 7A and detailed discussion of those blocks may not be repeated in FIG. 8. Reference can be made to figures.

At this point, discussion begins after block 606 branches to block 608 in which (yes) there are more spare lanes (i.e., unused lanes) available, and the drawer 102_0 (drawer 102_1 and/or computer 150) is configured to take the bad lane offline and replace the bad lane with the spare lane, for example, on bus 108_A at block 608. The bad lane (e.g., lane 7 corresponding to bit 7) is no longer being used. However, in addition to FIG. 7A, block 802 illustrates that the drawer 102_0 (drawer 102_1 and/or computer 150) is configured to quiesce the bus (e.g., bus 108_A). Quiescing the bus 108_A means that there is a pause on bus_A (caused by the drawer 102_0 and/or computer 150) such that data is stopped from being placed on the bus 108_A and transmitted to drawer 102_1. In the case where the bus 108 each have 12 lanes, this means that all 12 lanes on bus 108_A are blocked from being utilized to transmit data (i.e., signal). The other buses 108 (other than bus 108_A) connected to drawer 102_0 are still functioning normally (i.e., transmitting and receiving data), and the processes executing on processors of drawer 102_0 continue running. In an embodiment, the operation to quiesce the bus 802 may also include turning off pre-distortion circuits, scramble pattern circuitry, and/or other bus features in order to reduce noise. As noted above, the drawer 102_0 (drawer 102_1 and/or computer 150) is configured to run TDR analysis on the bad lane (bad lane 7) of bus 108_A while the bus 108_A is paused and then store the results of the TDR analysis in a TDR analysis table 750 (shown in FIG. 7B) at block 702. In this example scenario, it is assumed that the TDR equipment 302_0 in drawer 102_0 performed the TDR analysis and stored the results in table 750. It is appreciated that TDR equipment in drawer 102_1 could have performed the TDR analysis. The TDR analysis table 750 contains the location of the FRU that is the fault (i.e., needs to be replaced). In this scenario, the table 750 contains the information of whether the drawer 102_0, drawer 102_1, or bus 108_A is bad. The TDR analysis is performed without evacuating drawer 102_0 (or any other drawer 102) while the bus 108_A has been stopped from functioning.

After performing dynamic (single lane) TDR analysis 702, the drawer 102_0 (drawer 102_1 and/or computer 150) is configured to unquiesce the bus (e.g., bus 108_A) at block 804. Particularly, unquiescing the bus means that data can again be transmitted on bus 108_A from drawer 102_0 to drawer 102_1 in order to perform predefined tasks. The remainder of flow 800 is configured to operate as discussed in FIG. 7A and description of the blocks is not repeated.

Figure 9:
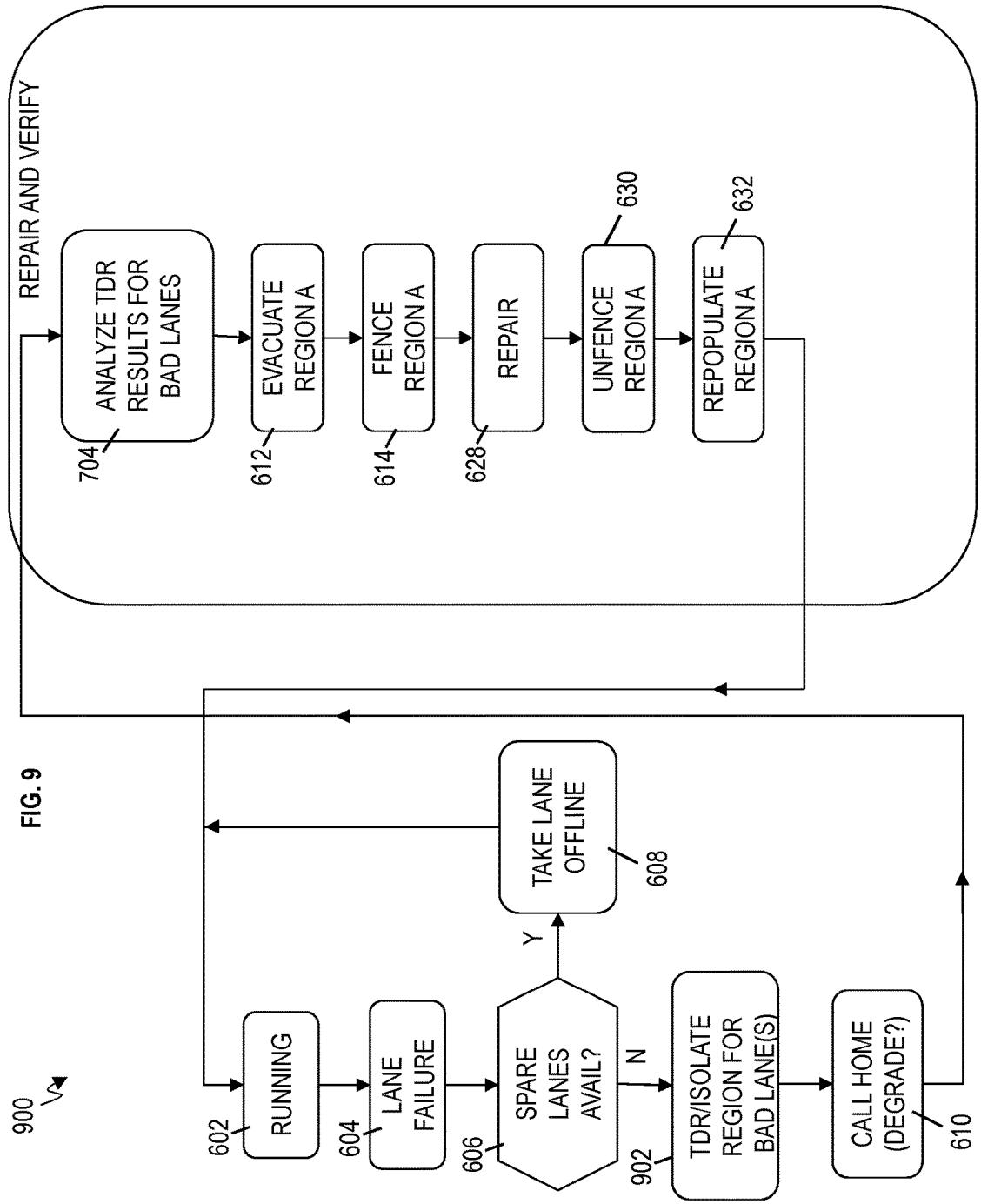
FIG. 9 depicts a flow chart of performing dynamic TDR analysis according to embodiments.

FIG. 9 depicts a flow chart 900 of performing dynamic time-domain reflectometry (TDR) analysis according to embodiments. FIG. 9 includes blocks from FIGS. 6, 7A, and 8, and detailed discussion of those blocks may not be repeated in FIG. 9.

At this point, flow begins after block 606 branches to block 902 because there are no more spare lanes (i.e., unused lanes) available, and the drawer 102_0 (drawer 102_1 and/or computer 150) is to perform TDR analysis. It is assumed that any bad lanes are no longer being used because they were taken off line and previously replaced with a spare lane. Continuing the example scenario, the technical problem is associated with drawer 102_0, drawer 102_1, and/or bus 108_A but the exact location is still unknown.

At block 902, dynamic TDR analysis is performed to isolate the region for bad lanes. For example, the TDR equipment 302_0 is configured to perform TDR on each of the bad lanes that have been spared (i.e., previously replaced with a spare lane and/or identified as being a bad lane). For example, lane 7 (i.e., bit 7) of bus 108_A is a bad lane. As such, the TDR equipment 302_0 is configured to perform TDR analysis on lane 7 of bus 108_A to determine the exact location of the problem, and the TDR analysis results are stored in the TDR table 750 (depicted in FIG. 7B). The TDR equipment 302_0 loops through all of the bad lanes on bus 108_A and stores their respective TDR analysis results in the TDR table 750. The drawer 102_0 (and 102_1) is still running normally when the TDR equipment 302_0 runs TDR on the bad lanes of bus 108_A, because the bad lanes have already been taken off line and are no longer in use for transmission of data. Therefore, the drawer 102_0 (and drawer 102_1) is not interrupted from its normal predefined tasks by running TDR on these bad lanes that are offline.

For example, while lanes 0-11 are running, lane i may stop working and get spared by spare lane j. In an embodiment, data that normally would be transferred over lane i will now be transferred over spare lane j, while all other lanes continue to transfer the data they were transferring. In another embodiment, lanes are shifted (via muxing) to reduce the impact of logic delay associated with a large mux. For instance, assume lanes 0-11 are primary lanes and that lane 12 is a spare lane. If lane 7 fails and needs to be spared, one way to do that is to transfer data for lanes 0-6 over lanes 0-6, respectively. However, since lane 7 fails, data for original primary lanes 7-11 would then be transferred over corresponding lanes 8-12, respectively. Other spare lane embodiments and scenarios may be implemented without deviating from the essence of this present disclosure.

At block 610, drawer 102_0 and/or the computer 150 is configured to call home. At block 704, the drawer 102_0 (and/or computer 150) is configured to parse and analyze the TDR results in the TDR table 750 in order to find the location of the fault which is at region A. As noted above for this scenario, the drawer 102_0 (and/or computer 150) determines that the location of the fault is at the drawer 102_1 (as depicted in FIG. 3) which represents region A. In accordance with embodiments of the invention, region A has been determined as the fault without first having to evacuate drawer 102_0 and/or without having to evacuate drawer 102_1. Now that drawer 102_1 is determined to be the fault, the flow continues in an analogous manner as discussed herein. For example, at block 612, region A is evacuated, which means that the FRU drawer 102_1 is evacuated (as depicted in FIG. 4). The drawer 102_1 is configured to evacuate itself (and/or computer 150 causes the drawer 102_1 to be evacuated).

The remainder of flow 900 is configured to operate as discussed in FIGS. 7A and 8, and description of the blocks is not repeated.

Figure 10:
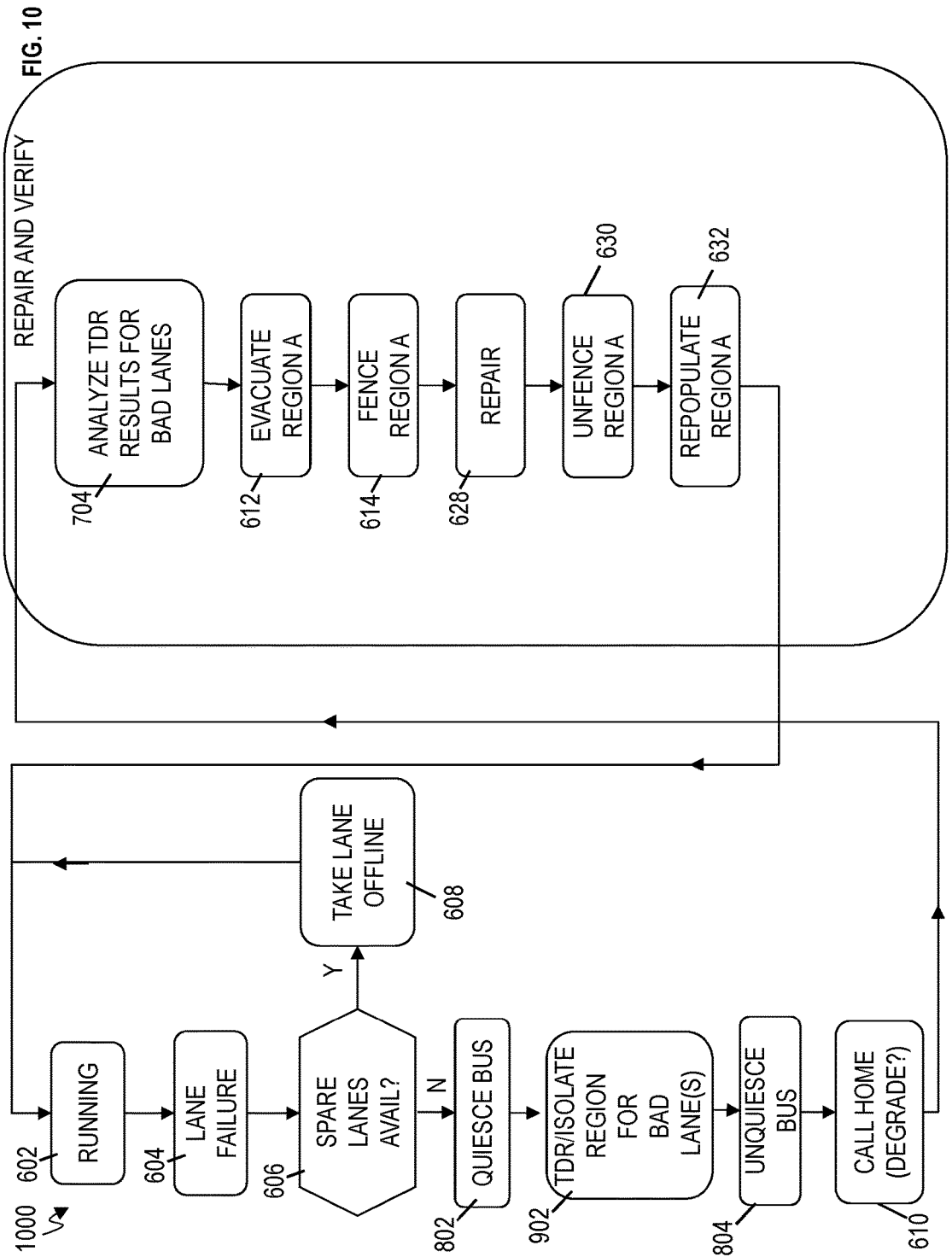
FIG. 10 depicts a flow chart of performing dynamic TDR analysis according to embodiments.

FIG. 10 depicts a flow chart 1000 of performing dynamic time-domain reflectometry (TDR) analysis according to embodiments of the invention. FIG. 10 includes blocks from FIGS. 6, 7A, 8, and 9 and detailed discussion of those blocks may not be repeated in FIG. 10.

At this point, flow begins after block 606 branches to block 802 because there are no more spare lanes (i.e., no unused lanes) available, and the drawer 102_0 (drawer 102_1 and/or computer 150) is ready to perform TDR analysis. It is assumed that any bad lanes are no longer being used because they were taken offline and previously replaced with a spare lane. The bad lane (e.g., lane 7 corresponding to bit 7) is no longer being used. Continuing the example scenario, the technical problem is associated with drawer 102_0, drawer 102_1, and/or bus 108_A but the exact location is still unknown.

At block 802, the drawer 102_0 (drawer 102_1 and/or computer 150) is configured to quiesce the bus (e.g., bus 108_A). Quiescing the bus 108_A means that there is a pause on bus_A (caused by the drawer 102_0 and/or computer 150) such that data is stopped from being placed on the bus 108_A and transmitted to drawer 102_1. In the case where the buses 108 each have 12 lanes, this means that all 12 lanes on bus 108_A are blocked from being utilized to transmit data (i.e., signal). The other buses 108 (other than bus 108_A) connected to drawer 102_0 are still functioning normally (i.e., transmitting and receiving data), and the processes executing on processors of drawer 102_0 continue running.

As noted above, the drawer 102_0 (drawer 102_1 and/or computer 150) is configured to run TDR analysis on the bad lane (bad lane 7) of bus 108_A while the bus 108_A is paused and store the results of the TDR analysis in a TDR analysis table 750 (shown in FIG. 7A) at block 902 (analogous to block 702). In this example scenario, it is assumed that the TDR equipment 302_0 in drawer 102_0 performed the TDR analysis and stored the results in table 750. It is appreciated that TDR equipment in drawer 102_1 could have performed the TDR analysis. The TDR analysis table 750 contains the location of the FRU that is the fault (i.e., needs to be replaced). In this scenario, the table 750 contains the information of whether the drawer 102_0, drawer 102_1, or bus 108_A is bad. The TDR analysis is performed without evacuating drawer 102_0 while the bus 108_A has been stopped from functioning.

In addition to block 702, block 902 further illustrates that TDR analysis is performed to isolate the region for all bad lanes. For example, the TDR equipment 302_0 is configured to perform TDR on each of the bad lanes that have been spared (i.e., replaced with a spare lane). As noted above, the TDR equipment 302_0 performs TDR analysis on lane 7 of bus 108_A to determine the exact location of the problem, and the TDR analysis results are stored in the TDR table 750 (depicted in FIG. 7B). Further, the TDR equipment 302_0 loops through all of the bad lanes on bus 108_A (where the other bad lanes could be lanes 10 and 11) and stores their respective TDR analysis results in the TDR table 750. The drawer 102_0 (and 102_1) is still running normally (other than the short quiesce period, where data sent over 108_A is temporarily halted) when the TDR equipment 302_0 runs TDR on the bad lanes of bus 108_A, because the bad lanes have already been taken offline and are no longer in use for transmission of data. Therefore, the drawer 102_0 (and drawer 102_1) is noted interrupted from its normal predefined tasks. In an embodiment, block 902 may run TDR on bad lanes that were not able to be repaired.

After performing TDR analysis, the drawer 102_0 (drawer 102_1 and/or computer 150) is configured to unquiesce the bus (e.g., bus 108_A) at block 804. As noted above, unquiescing the bus means that data can again be loaded and transmitted on bus 108_A from drawer 102_0 to drawer 102_1 in order to perform predefined tasks.

At block 610, drawer 102_0 and/or the computer 150 is configured to call home. The remainder of flow 1000 is configured to operate as discussed in FIGS. 7A, 8, and 9, and description of the blocks is not repeated.

Figure 11:
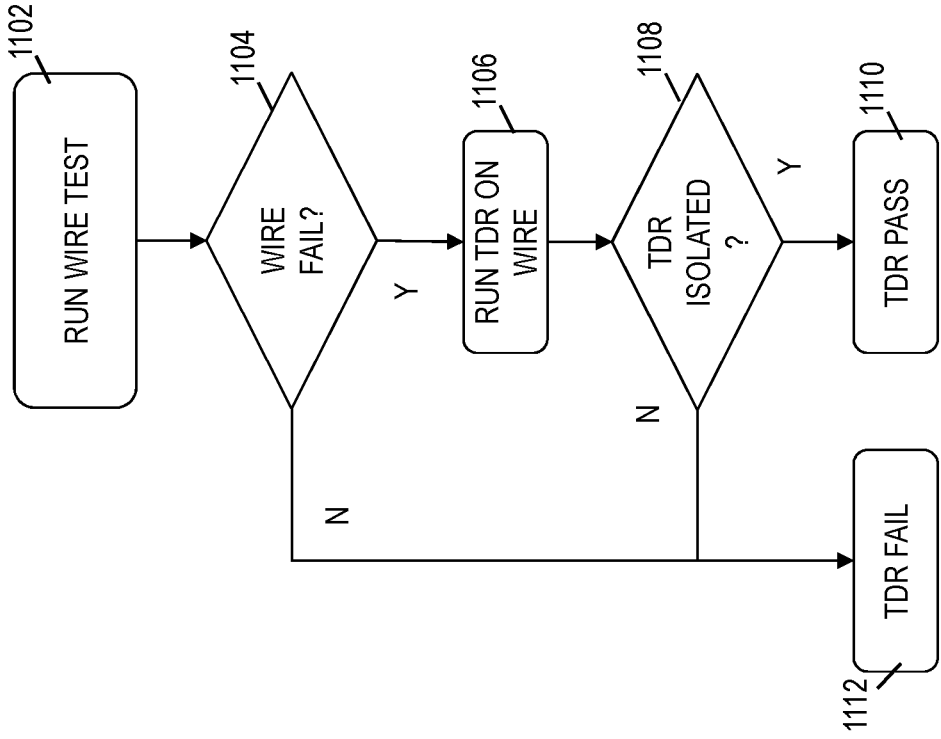
FIG. 11 depicts a flow chart of TDR for an example wire test according to embodiments of the invention.

FIG. 11 depicts a flow chart 1100 of TDR for an example wire test. At this point, it has previously been determined which lanes (bits) need to have TDR run on them as discussed herein. At block 1102, a wire test is run on the bad lane. Continuing the scenario from above, it is assumed that lane 7 on bus 108_A is bad and being tested. The TDR equipment 302_0 and 302_1 includes functionality to run wire tests, such as direct current (DC) wire tests. In other implementations, there can be separate wire test equipment (not shown) in the IFC 106_0 and 106_1 of drawers 102_0 and 102_1, respectively.

The TDR equipment 302_0 and 302_1 in or connected to, for example, the interface circuit 106_0 and 106_1, respectively, is configured to execute a wire test on each of the wires (i.e., for a differential wire pair) in lane 7. An example of a wire test is for the driver to drive a wire high while the receiver samples the voltage at the receiver to make sure it is high. The test is repeated with the driver pushed to a low voltage while the receiver is checked for a low voltage. At block 1104, the TDR equipment 302_0 and 302_1 are configured to check if the wire test failed to detect a failed wire. If the wire fails to detect a wire fail during the wire test, the flow ends at block 1112 with a TDR failure indication. If the wire test detects a wire fail, TDR equipment 302_0 is configured to execute TDR on the wire at block 1106. A check is performed to see if the TDR is isolated 1108. If the TDR is not isolated, the flow ends with a TDR failure indication at block 1112. Otherwise, when the TDR analysis isolates the location of the fail, the TDR passes at block 1110. It is noted that embodiments of the invention can skip block 1102, 1104, and begin at block 1106.

Figure 12:
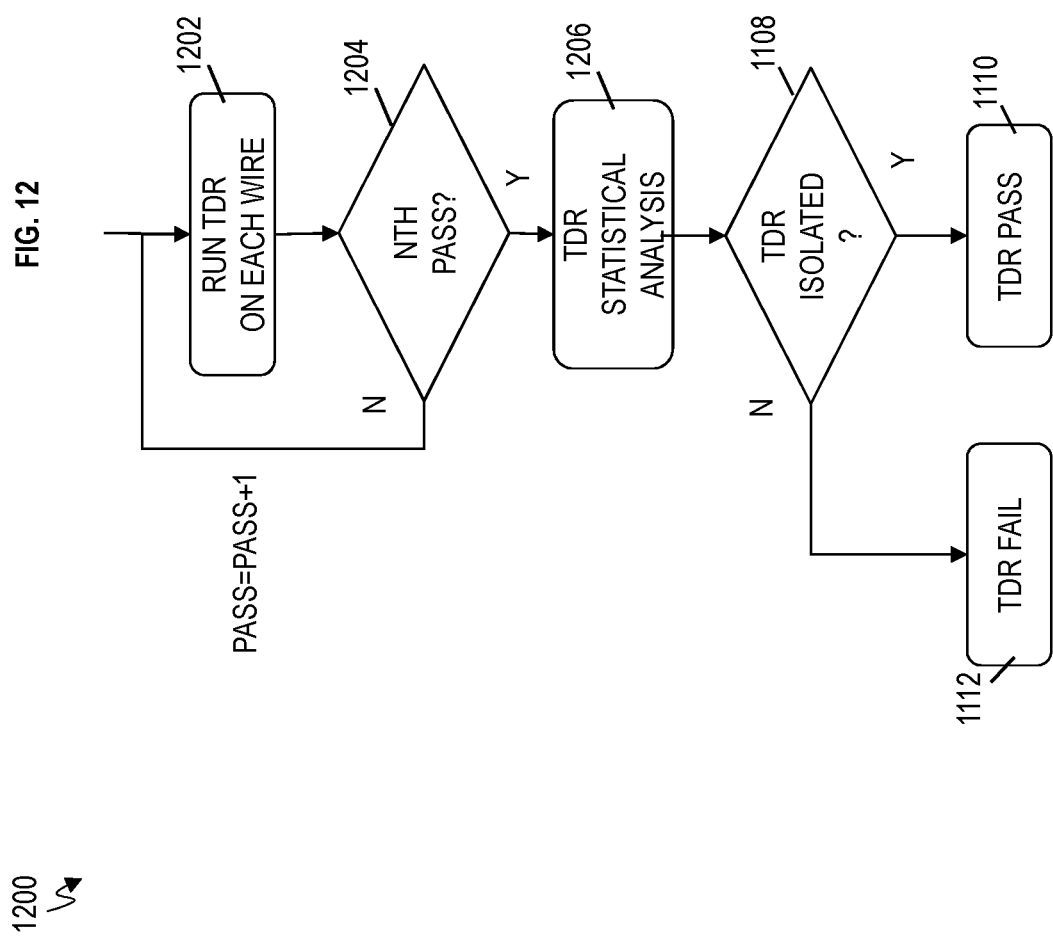
FIG. 12 depicts a flow chart of running multiple TDR processes on each wire of a bus to statistically isolate the location of the problem according to embodiments of the invention.

FIG. 12 depicts a flow chart 1200 of running multiple TDR processes on each bad wire to statistically isolate the location of the problem according to embodiments of the invention. By statistically isolating the location of the fault (by running TDR multiple times on the same wire(s) of the bad lane 7 on bus 108_A), the drawer 102 (and/or computer 150) allows for running TDR in noisy environments, and this avoids having to shut down the interfaces (e.g., interfaces 106_0 and 106_1) due to noise. At this point, it has previously been determined which lanes (bits) that need to have TDR run on them as discussed herein.

At block 1202, TDR equipment 302_0 is configured (or the computer 150 causes TDR equipment 302_0) to run TDR separately on each wire (assuming a differential pair of wires such as wires 1302 and 1304 which together form a lane, such as lane 7).

At block 1204, TDR equipment 302_0 is configured (and/or the computer 150 causes TDR equipment 302_0) to check if this is the Nth pass of running TDR on the same wire (e.g., wire 1302 or 1304). In this example, "N" is a predefined number determined in advance such that a statistical sample is taken to eliminate noise as a factor in isolating the bad wire.

If N number of runs for TDR has not occurred, the flow returns to block 1202. If this is the Nth number of runs for TDR on the same wire, TDR equipment 302_0 (and/or the computer 150) is configured to perform TDR statistical analysis at block 1206. TDR statistical analysis can include averaging the defect times provided by the TDR logic, projecting a trendline of probable defects, minimizing the root-mean-square (RMS) errors to create a best-fit line that projects the most likely defect location, in addition to other statistical techniques. TDR equipment 302_0 (and/or the computer 150) is configured to check if the TDR has isolated the fault (bad FRU, such as bad wire 1302, 1304, bad drawer 102_0, 102_1) at block 1108. If (yes) the fault is isolated, the TDR passes at block 1110. If (no) the fault is not isolated, the TDR fails at block 1112. In an embodiment vital product data (VPD) is updated after a successful, passing TDR analysis 1110.

Figure 14:
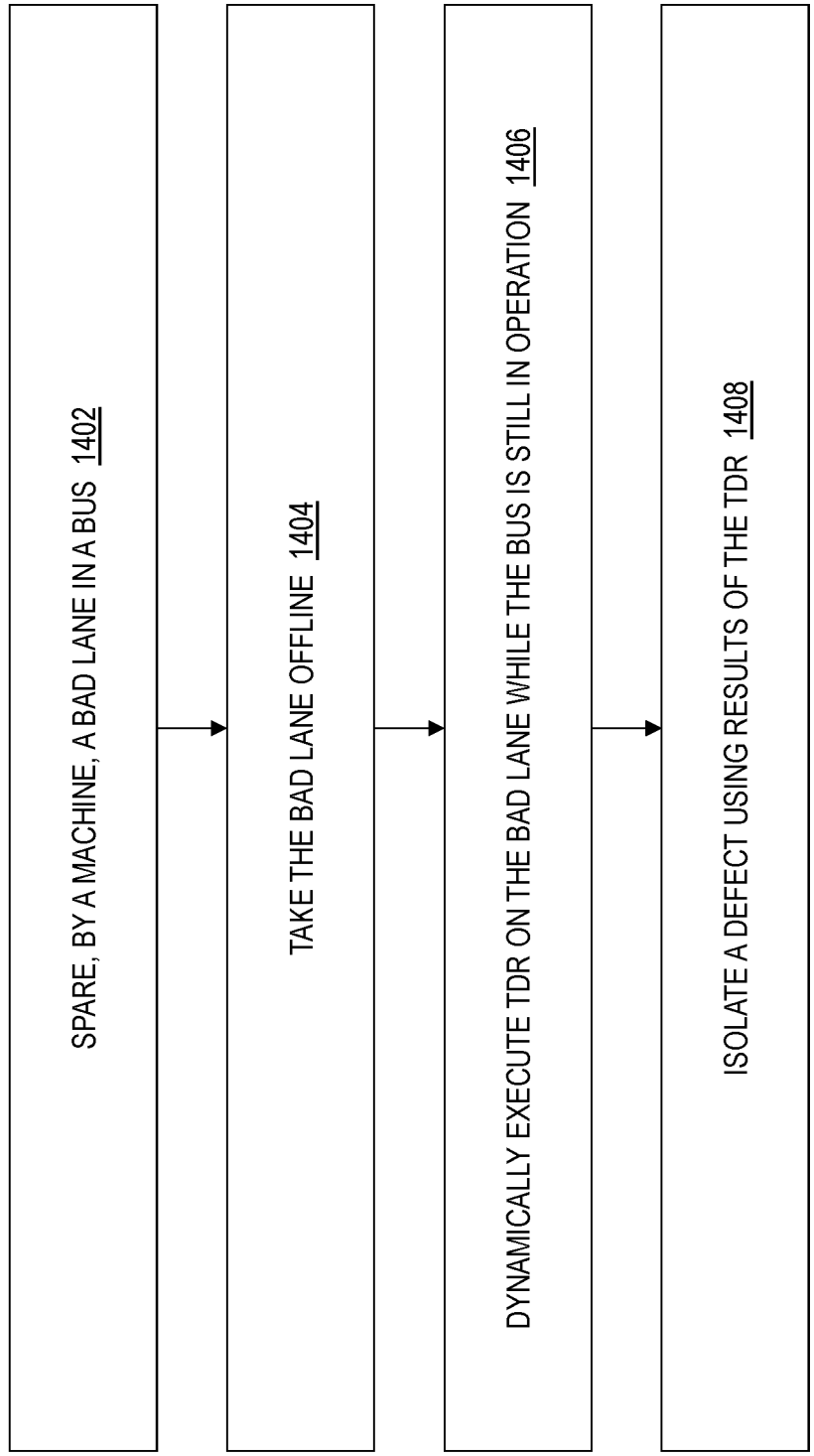
FIG. 14 depicts a flow chart of a computer-implemented method for dynamic TDR according to embodiments of the invention.

FIG. 14 is a flow chart 1400 of a computer-implemented method for dynamic time-domain reflectometry (TDR) according to embodiments of the invention. For explanation purposes, the scenario of bus 108_A having a bad lane (e.g., lane 7) is continued, but it is understood that embodiments of the invention are not meant to be limited to the example scenario.

At block 1402, a machine (such as the drawer 102_0 and/or the computer 150) is configured to spare a bad lane (e.g., bad lane 7) in a bus (e.g., bus 108_A). The drawer 102_0 and/or the computer 150 determines that a spare lane is available for use on bus 108_A, and the bad lane 7 is replaced with a spare lane on the bus 108_A. A bad lane may be attributed to lane i in FIG. 13 while a spare lane may be attributed to lane j in FIG. 13.

At block 1404, the machine (such as the drawer 102_0 and/or the computer 150) is configured to take the bad lane offline. The bad lane 7 (or lane i in FIG. 13) is no longer being used for normal operation and the spare lane (lane j in FIG. 13) is used instead. Normal operation includes transmitting data over the lane and the data (which may include control signals) is associated with accomplishing predefined tasks on drawer 102_0 and 102_1 which are connected via lane 7 of bus 108_A. The predefined tasks can include processing requests, memory requests, etc. Normal operation/communication on the lane 7 does not include TDR tests/communications and/or wire tests.

At block 1406, the machine (such as the drawer 102_0 and/or the computer 150) is configured to dynamically execute TDR on the bad lane (e.g., lane 7) while the bus is still in operation. For example, lanes 0-11 on bus 108_A that are not bad continue to operate under normally, and the spare lane operates in place of the bad lane. However, the taken off lane (which was bad lane 7) is being tested by the TDR equipment 302_0.

At block 1408, the machine (such as the drawer 102_0 and/or the computer 150) is configured to isolating a defect/fault using results (in table 750) of the TDR.

Dynamically executing TDR on the bad lane while the bus is still in operation comprises performing TDR on each wire 1302, 1304 of the bad lane (e.g., lane 7).

The bad lane a first wire 1302 and a second wire 1304. The first wire 1302 and the second wire 1304 form a differential pair of wires.

Isolating the defect/fault using results (table 750) of the TDR locates whether the defect is in the machine (e.g., drawer 102_0), another machine (drawer 102_1) connected to the machine, or the bus (bus 108_A) connecting the machine and the another machine.

Sparing the bad lane in the bus includes using a spare lane in place of the bad lane. The bus 108_1 includes other lanes (e.g., lanes 0-6 and 8-11) in addition to the bad lane (e.g., lane 7). The other lanes are in operation to communicate data associated with predefined tasks while dynamically executing TDR on the bad lane (i.e., the previous lane 7 (bad lane) has been taken offline such that it is not in operation to communicate data associated with predefined tasks).

Figure 15:
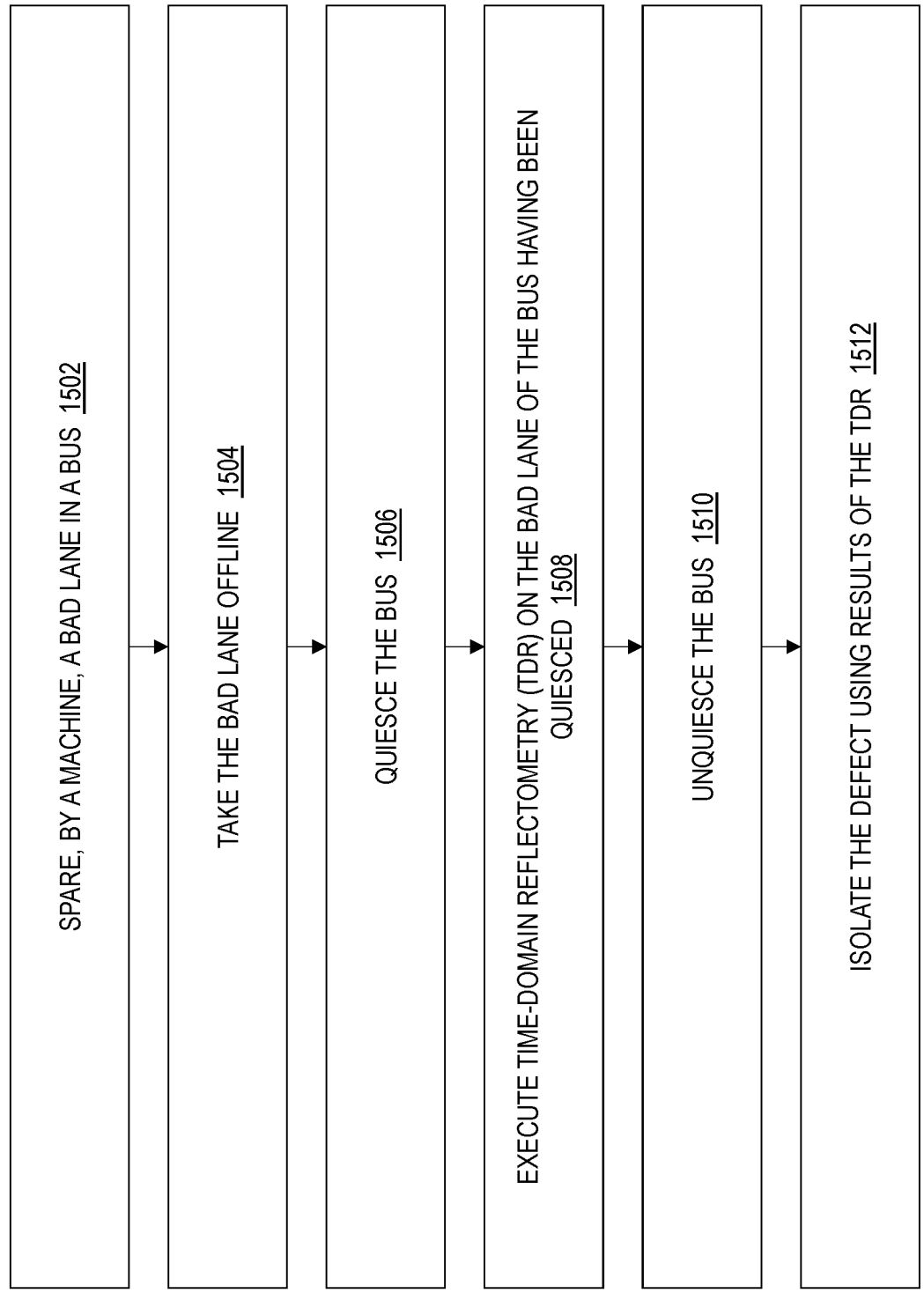
FIG. 15 depicts a flow chart of a computer-implemented method for dynamically isolating a defect according to embodiments of the invention.

FIG. 15 is a flow chart 1500 of a computer-implemented method for dynamically isolating a defect according to embodiments of the invention. For explanation purposes, the scenario of bus 108_A having a bad lane (e.g., lane 7) is continued, but it is understood that embodiments of the invention are not meant to be limited to the example scenario.

At block 1502, a machine (such as the drawer 102_0 and/or the computer 150) is configured to spare a bad lane (e.g., lane 7) in a bus (e.g., bus 108_A). At block 1504, taking the bad lane offline.

At block 1504, the machine (such as the drawer 102_0 and/or the computer 150) is configured to quiesce the bus 108_A.

At block 1506, the machine (such as the drawer 102_0 and/or the computer 150) is configured to execute TDR (via TDR equipment 302_0) on the bad lane 7 of the bus 108_A having been quiesced.

At block 1508, the machine (such as the drawer 102_0 and/or the computer 150) is configured to unquiesce the bus 108_A.

At block 1510, the machine (such as the drawer 102_0 and/or the computer 150) is configured to isolate the defect/fault using results (in table 750) of the TDR.

Quiescing the bus 108_A includes pausing transmission of data on the bus 108_A from the machine (drawer 102_0) to another machine (drawer 102_A) in the direction that communication data is transmitted on the bus 108_A.

Unquiescing the bus comprises resuming transmission of data on the bus from the machine to another machine.

Isolating the defect/fault using results (table 750) of the TDR locates whether the defect is in the machine (e.g., drawer 102_0), another machine (drawer 102_1) connected to the machine, or the bus (bus 108_A) connecting one drawer with another.

Sparing the bad lane in the bus includes using a spare lane in place of the bad lane. The bus 108_1 includes other lanes (e.g., lanes 0-6 and 8-11) in addition to the bad lane (e.g., lane 7). The other lanes are in operation to communicate data associated with predefined tasks while dynamically executing TDR on the bad lane (i.e., the previous lane 7 (bad lane) has been taken offline such that it is not in operation to communicate data associated with predefined tasks).

Figure 16:
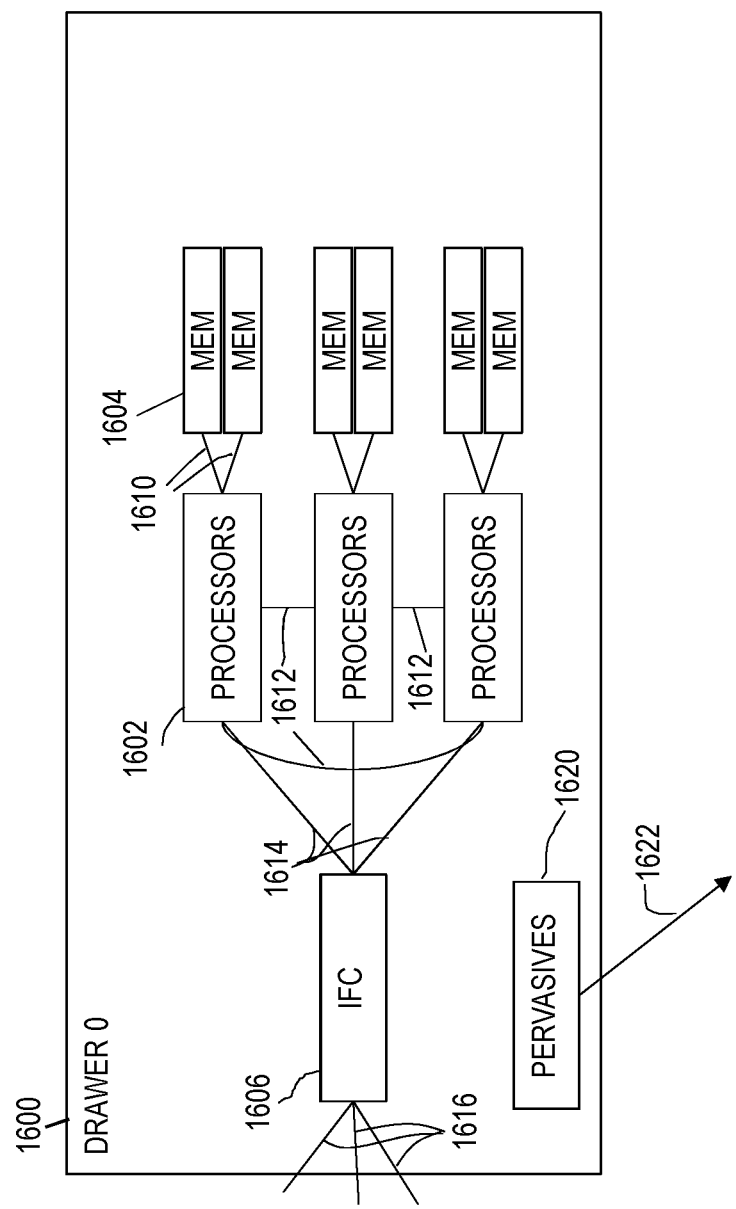
FIG. 16 depicts a system drawer according to embodiments of the invention.

Turning now to a more detailed description of aspects of the any system drawers (such as, for example, the drawers 102_0 through 102_3), FIG. 16 depicts a system drawer 1600 according to embodiments of the invention. The computer system drawer 1600 includes computer equipment which is a collection of processors 1602, memory 1604, interfaces 1606, and pervasive logic 1620 that are interconnected. Processors are interconnected to each other through processor interface buses 1612. In an embodiment, processor interface buses 1612 consist of two unidirectional buses (one in each direction). Embodiments of a processor interface bus can be 'single-ended' or differential.

In some embodiments, processors 1602 are connected to one or more system controller chips (SC) 1606 through system controller interface buses 1614. In an embodiment, system controller interface buses 1614 consist of two unidirectional buses (one in each direction). Embodiments of a system controller interface bus can be 'single-ended' or differential.

In some embodiments, processors 1602 are connected to memory 1604 through memory interface buses 1610. In an embodiment, a memory interface bus 1610 consists of two unidirectional buses 1610 (one bus from a processor 1602 to memory 1604 and another bus from memory 1604 to a processor 1602). Embodiments of each bus can be either 'single-ended' (also referred to as single wire) or differential (e.g., with a true and complement wire).

In some embodiments, system controller chips (SC) 1606 are used to connect multiple drawers (such as, for example, drawers 102_0 through 102_3) together through buses 1616. An embodiment of bus 1616 is equivalent to bus 108, shown in FIG. 1.

For each of the on-drawer buses (memory bus 1610, processor bus 1612, system controller bus 1614), there is TDR logic (not shown) on the driver side of each interface, which can run either state-of-the-art (static) TDR (in a quiesced system during IML (Initial Machine Load) such that the drawer has to be evacuated before running TDR) and/or can run dynamically as part of dynamic TDR in accordance with embodiments of the invention.

Whether TDR runs statically (state-of-the-art method) or dynamically (in accordance with the embodiments of the invention), pervasive logic 1620 is used to log out vital product data (VPD) identifying TDR results (including TDR delays, FRUs, tags, timestamps, failure information, isolation information, defect information, etc.) across a pervasive interface 1622 to an internal or external location. This location can be a computer support element (SE) (including, for example, computer 150), network, disk, cache, storage medium, wireless interface, optical, database, or any other location for storage or processing, whether through hardware, firmware, software, or inspection.

Turning now to example events associated with embodiments of the present invention shown (in contrast to the state-of-the-art), FIG. 17 depicts a timeline 1700. A lane spare event 1714 indicates that a lane sparing event has occurred for a failing lane in a bus 108 (1610, 1612, 1614, or 1616). It can be appreciated that a failure causing a spare lane event could be caused by one or more conditions. For instance, there could be a primary environmental or noise event window 1702 that could contribute to the lane failure causing the lane spare event 1714. There could be another secondary environmental or noise event window 1704 that could also contribute to the lane failure causing the lane spare event 1714. While the timeline in FIG. 17 depicts two such environmental or noise event windows 1702, 1704, there could be a multitude of independent or dependent windows. There can also be periods of time when only one or a subset of environmental or noise event windows 1702, 1704 are active, which may or may not necessarily lead to a lane spare event 1714.

State-of-the-art static TDR 1710 would run some time later during a recovery/repair window 1706 or initial machine load (IML) window 1706 (hours or days after a lane spare event 1714 takes place). Historically, this system (at the time of window 1706) has less environmental stress and/or less noise compared to a running system (when the original lane spare event 1714 occurred). Therefore, there is some likelihood that static TDR 1710 would fail to isolate a lane to the defective region (i.e., fail to determine location of the defective region) which caused the original lane spare event 1714.

On the other hand, dynamic TDR 1708 is run immediately following a lane repair event 1714 (e.g., within less than 5 milliseconds (ms), 10 ms, 20 ms, 30 ms, . . . 100 ms, within less than 5, 10, 15, . . . 20 seconds, or even within less than 1, 2, 3, . . . 5 minutes(s)). The likelihood of dynamic TDR 1708 running in the same environmental or noise event window combination 1702 of 1704 as the original lane repair event 1714 is high. Therefore, embodiments of the present invention can more accurately isolate the defect which led to the original lane spare event 1714 under the same environmental and/or noise event conditions that caused the lane to fail.

In the state-of-the-art static TDR 1710, static data collection 1712c would occur much later (e.g., after parts have been shipped) during an IML or repair and verify window 1706. This means, there is no ability to isolate the bad parts prior to shipping parts to the field for repair. This can cost more money, since all parts that could cause the lane spare event 1714 would need to be shipped (e.g. CP, DIMM, and board, even though TDR may isolate the part to a single DIMM).

In contrast, dynamic TDR 1708 can supply isolation and vital product data (VPD) during the earlier window for data collection 1712a. This means the isolation of a subset of parts (e.g., DIMM only) can be used to ship a minimum amount of parts, thus saving money.

Another benefit of embodiments of the invention is machine learning. Since dynamic TDR runs on lane spare events 1714, valuable field data is available to assess all the field lane events (not just the ones that call home). For instance, in an embodiment where a memory interface 1610 has two lane spares available, there may be a first lane spare event 1714a and a second lane spare event 1714b. For state-of-the-art static TDR 1710, none of this data was available until there was a call home for repair, and such data would only be collected as part of 1712c. However, embodiments of the present invention allow the first lane spare event 1714a to run dynamic TDR 1708a and log the data 1712a. Embodiments of the invention also allow the second lane spare event 1714b to run dynamic TDR 1708b and log the data 1712b. The state-of-the-art would only log data at 1712c and may take years before hitting a second event (or never log data in the event of only a single lane spare out of two or more, where a call home/repair does not occur).

While some of the benefits of running dynamic TDR 1708 and performing early data collection 1712b shortly after the lane spare event 1714 have been discussed, other advantages are anticipated by those skilled in the art when practicing embodiments of the invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer program product for dynamic time-domain reflectometry (TDR), the computer program product comprising a computer readable storage medium having program instructions embodied therewith, wherein the computer readable storage medium is not a transitory signal per se, the program instructions readable by a machine to cause the machine to perform a method comprising:
   determining, by a machine, a bad lane on a bus;
   in response to the machine determining the bad lane on the bus, sparing, by the machine, the bad lane in the bus by identifying a spare lane to utilize;
   taking the bad lane offline;
   dynamically executing TDR on the bad lane while the bus is still in operation; and
   isolating a defect using results of the TDR.

2. The computer program product of claim 1, wherein dynamically executing TDR on the bad lane while the bus is still in operation comprises performing TDR on each wire of the bad lane.

3. The computer program product of claim 1, wherein the bad lane comprises a first wire and a second wire.

4. The computer program product of claim 3, wherein the first wire and the second wire form a differential pair of wires.

5. The computer program product of claim 1, wherein isolating the defect using the results of the TDR locate whether the defect is in the machine, another machine connected to the machine, or the bus connecting the machine and the another machine.

6. The computer program product of claim 1, wherein sparing the bad lane in the bus comprises using the spare lane in place of the bad lane.

7. The computer program product of claim 1, wherein the bus comprises other lanes in addition to the bad lane; and
   wherein the other lanes are in operation to communicate data associated with predefined tasks while dynamically executing TDR on the bad lane.

8. The computer program product of claim 1, wherein the machine determined the bad lane on the bus prior to dynamically executing TDR on the bad lane while the bus is still in operation.

* * * * *